United States Patent [19]

Fitzgerald

[11] Patent Number: 5,408,665
[45] Date of Patent: Apr. 18, 1995

[54] SYSTEM AND METHODS FOR LINKING COMPILED CODE WITH EXTENDED DICTIONARY SUPPORT

[75] Inventor: Judith A. Fitzgerald, San Jose, Calif.

[73] Assignee: Borland International, Inc., Scotts Valley, Calif.

[21] Appl. No.: 56,686

[22] Filed: Apr. 30, 1993

[51] Int. Cl.⁶ .............................................. G06F 9/45
[52] U.S. Cl. .............................. 395/700; 364/DIG. 1; 364/280.4; 364/262.5
[58] Field of Search .................. 395/700; 364/DIG. 1

[56] References Cited

U.S. PATENT DOCUMENTS

| | | | |
|---|---|---|---|
| 5,170,465 | 12/1992 | McKeeman et al. | 395/700 |
| 5,175,828 | 12/1992 | Hall et al. | 364/DIG. 1 |
| 5,182,807 | 1/1993 | Mizuse et al. | 395/700 |
| 5,247,678 | 9/1993 | Littleton | 395/700 |
| 5,297,291 | 3/1994 | Murphy | 395/700 |

OTHER PUBLICATIONS

The MS-DOS Encyclopedia, Article 20: The Microsoft Object Linker, 1988, pp. 701–721.

*Primary Examiner*—Thomas M. Heckler
*Attorney, Agent, or Firm*—John A. Smart; Vernon A. Norviel; Michael J. Ritter

[57] ABSTRACT

A development system of the present invention includes a compiler, a linker, and an interface. The compiler serves to compile source listings into object modules (which are initially stored in .OBJ files). A librarian is provided for combining desired ones of the .OBJ files into one or more library files. For each library file, the librarian provides an Extended Dictionary of the present invention, which includes a Dependency List and an Unresolved Externals List for each module of the library. Methods are described for linking object modules from .OBJ files and library files, where library object modules which are not needed for the link may be determined before the libraries are scanned during the first pass of the linker. In this manner, library object modules which are not needed during subsequent linking operations can be skipped.

30 Claims, 17 Drawing Sheets

OBJ RECORD LAYOUT
240

| RECORD TYPE (BYTE) ⟵241 | RECORD LENGTH (WORD) ⟵242 | CONTENTS (VARIABLE) ⟵243 | CHECKSUM (BYTE) ⟵244 |
|---|---|---|---|

FIG. 2C

THEADR (MODULE HEADER) RECORD
250

| RECORD TYPE = 80h (BYTE) | RECORD LENGTH (WORD) | MODULE NAME (STRING) ⟵253 | CHECKSUM (BYTE) |
|---|---|---|---|

FIG. 2D

EXTDEF (EXTERNAL NAMES DEFINITION) RECORD
260

| RECORD TYPE = 8Ch (BYTE) | RECORD LENGTH (WORD) | EXTERNAL NAME (STRING) ⟵263a | TYPE INDEX (BYTE) ⟵263b | CHECKSUM (BYTE) |
|---|---|---|---|---|

FIG. 2E

PUBDEF (PUBLIC NAMES DEFINITION) RECORD
270

| RECORD TYPE = 90h (BYTE) | RECORD LENGTH (WORD) | ⟵273 | CHECKSUM (BYTE) |
|---|---|---|---|

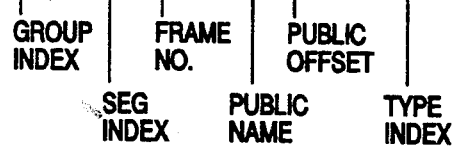

GROUP INDEX, SEG INDEX, FRAME NO., PUBLIC NAME, PUBLIC OFFSET, TYPE INDEX

FIG. 2F

COMDEF (COMMUNAL DEFINITION) RECORD
280

| RECORD TYPE = B0h (BYTE) | RECORD LENGTH (WORD) | ⟵283 | CHECKSUM (BYTE) |
|---|---|---|---|

COMMUNAL NAME, TYPE INDEX, DATA SEG. TYPE, COMMUNAL LENGTH

FIG. 2G

SYSTEM AND METHODS FOR LINKING COMPILED CODE WITH EXTENDED DICTIONARY SUPPORT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to the field of development systems for computers and, more particularly, to systems and methods for compiling source programs into object modules and linking those modules into programs executable by computers.

Before a digital computer may accomplish a desired task, it must receive an appropriate set of instructions. Executed by the computer's microprocessor, these instructions, collectively referred to as a "computer program," direct the operation of the computer. Expectedly, the computer must understand the instructions which it receives before it may undertake the specified activity.

Owing to their digital nature, computers essentially only understand "machine code," i.e. the low-level, minute instructions for performing specific tasks—the sequence of ones and zeros that are interpreted as specific instructions by the computer's microprocessor. Since machine language or machine code is the only language computers actually understand, all other programming languages represent ways of structuring human language so that humans can get computers to perform specific tasks.

While it is possible for humans to compose meaningful programs in machine code, practically all software development today employs one or more of the available programming languages. The most widely used programming languages are the "high-level" languages, such as C or Pascal. These languages allow data structures and algorithms to be expressed in a style of writing which is easily read and understood by fellow programmers.

A program called a "compiler" translates these instructions into the requisite machine language. In the context of this translation, the program which is written in the high-level language is called the "source code" or source program. Translating human-oriented programming languages into computer-oriented machine languages, compilers allow computer programmers to ignore the machine-dependent details of machine language. Compilers are now fundamental to modern-day application and system software development.

Most compilers are syntax driven, i.e., the compilation process is directed by the syntactic structure of the source program, as recognized by a compiler's parser. The parser builds the structure out of tokens, the lowest-level symbols used to define a programming language's syntax. This recognition of syntactic structure is a major part of the analysis task. Semantic routines actually supply the meaning (semantics) of the program, based on the syntactic structures. The semantic routines generate the target code or, optionally, some intermediate representation thereof.

The ultimate output of the compiler is an "object module". Although an object module includes object code for instructing the operation of a computer, the object module is not in a form which may be directly executed by a computer. Instead, it must undergo a "linking" operation before the final executable program is created.

While linking involves many specific operations, it may be thought of as the general process of combining or linking together one or more compiled object modules to create an executable program. This task usually falls to a "linker." In typical operation, a linker receives, either from the user or from an integrated compiler, a list of object modules desired to be included in the link operation. The object modules themselves may either be stored separately in standalone object or .OBJ files which the compiler has generated, or in "library" or .LIB files which are .OBJ files aggregated into a single file by a "librarian". In operation, the linker scans the object modules from the object and library files specified. After resolving interconnecting references as needed, the linker constructs an executable image by organizing the object code from the modules of the program in a format understood by the operating system program loader.

Without further enhancement, linking incurs substantial processing time and resources for handling object modules in libraries which are ultimately not needed in the link. The data from the modules is read and buffered in memory, and all of the information for these modules is examined and analyzed. All told, the process requires a considerable amount of processing time and resources for determining exactly which object modules are needed in the link. Moreover, a significant amount of internal storage is dedicated to caching information extracted from the object modules.

What is needed is a linker which knows beforehand which object modules are needed. More particularly, if a linker knows before libraries are read which object modules are needed for a link, unnecessary modules may be skipped (i.e., not read) during the link. Both processing time and internal storage requirements for the linking operation may be substantially reduced. Not only would such a linker be faster, but it would also have greater capacity. The present invention fulfills this and other needs.

SUMMARY OF THE INVENTION

The development system of the present invention includes a compiler, a linker, and an interface. The compiler generates or "compiles" object modules. In an exemplary embodiment, these are (initially) stored in Object Module Format (OMF) as .OBJ files. These may be linked or combined with other object modules stored in "library" files to create an executable program.

A librarian is provided for creating library files. Each library file is organized as a collection of .OBJs, followed by a Standard Dictionary and an Extended Dictionary of the present invention. The Standard Dictionary lists the "publics" (public references) and module names for the library; each entry in the dictionary includes a file offset where the public may be found (in the .OBJs). According to the present invention, the Standard Dictionary entry for a public reference also includes a pointer (back into the Standard Dictionary) to the name of the module which contains the public. In this manner, the module name (and a module ID) for the module which includes the public may readily be determined; the module is added to a list of modules which are needed to be included for linking.

During linking of object modules, the system scans the object modules of .OBJ files and builds an External Table. The table is a list of "externs" from object modules of .OBJ files (i.e., references which have not yet been resolved). For each entry in the External Table, the system searches the Standard Dictionary of each library (listed to be included in the link) until a public satisfying the extern is found. When one is found, its module name and ID are retrieved from the Standard Dictionary.

Since the module may depend upon (i.e., invoke) other modules of the library, the Extended Dictionary of the library file includes a "Dependency List." Specifically, for each module in the library, the list sets forth other modules which must also be included with the module. Using the ID for the module, its dependencies (i.e., modules which must also be included for this module) are determined during linking; each is added to the list of modules to be included in the link. Since each of these (dependent) modules may, in turn, itself depend upon other modules, the system recursively checks dependencies.

The subject module may also depend upon (i.e., invoke) references which are external to its library. Therefore, the Extended Dictionary also includes an "Unresolved Externals List"—a list which sets forth for each module of the library references which are not satisfied by the library but must nevertheless be included (and resolved) in the link. If an external is encountered which cannot yet be resolved (i.e., from information in the Symbol Table), an entry in placed in the External Table (where it will be processed according to this method just as the other externs).

After all entries in the Externals Table have been processed, all modules in the libraries which are needed are known. Thus, the remaining steps of the linking operation may proceed with unneeded modules of the libraries skipped. Both processing time and internal storage requirements for the remainder of the linking operation are substantially reduced.

BRIEF DESCRIPTION OF THE DRAWINGS

FIGS. 2C-G are block diagrams illustrating the layout of records which are employed by object modules generated by the compiler (of FIG. 2A)

DETAILED DESCRIPTION OF A PREFERRED EMBODIMENT

General Architecture

A. System Hardware and Software

Figure 1A:
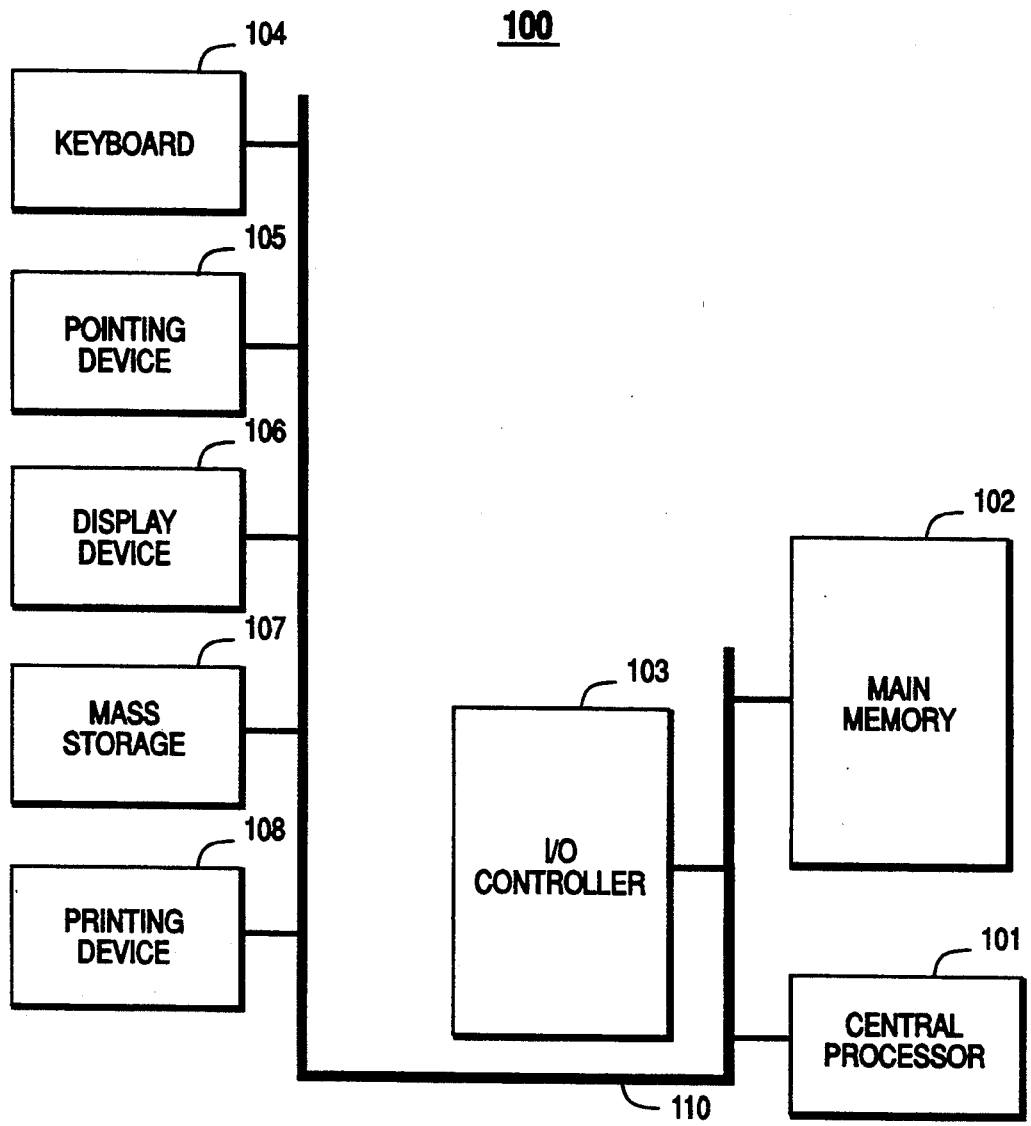
FIG. 1A is a block diagram of a computer system in which the present invention may be embodied.

The present invention may be embodied on a computer system such as the system 100 of FIG. 1A, which includes a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a printing device 108, may be provided with the system 100 as desired. As shown, the various components of the system 100 communicate through a system bus 110 or similar architecture.

Figure 1B:
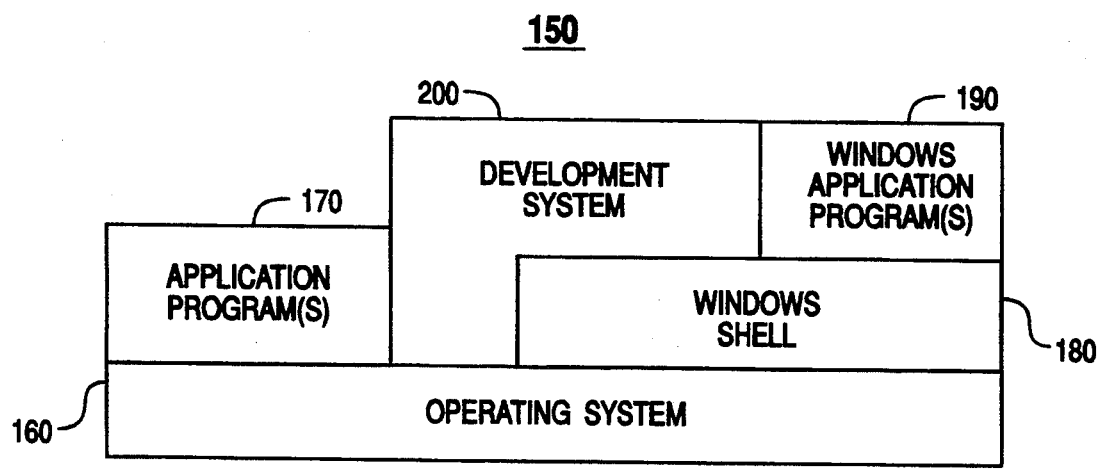
FIG. 1B is a block diagram of a software system for controlling the operation of the system of FIG. 1A.

Illustrated in FIG. 1B, a computer software system 150 is provided for programming the operation of the computer system 100. Software system 150, which is stored in system memory 102 and on disk memory 107, includes a kernel or operating system (OS) 160 and a windows shell or interface 180. One or more application programs, such as application programs 170 or windows applications programs 190, may be "loaded" (i.e., transferred from storage 107 into memory 102) for execution by the system 100. OS 160 and shell 180, as well as application software 170, 190, include an interface for receiving user commands and data and displaying results and other useful information. Software system 150 also includes a development system 200 of the present invention for developing system and application programs. As shown, the development system 200 includes components which interface with the system 100 through windows shell 180, as well as components which interface directly through OS 160.

In a preferred embodiment, the system 100 is an IBM-compatible personal computer, available from a variety of vendors (including IBM of Armonk, N.Y.). Operating system 160 is MS-DOS and shell 180 is Microsoft Windows, both of which are available from Microsoft Corporation of Redmond, Wash. Alternatively, the system 100 may be implemented in other platforms, including Macintosh, UNIX, and the like. Development system 200 includes Borland® C++ & Application Frameworks ™, available from Borland International of Scotts Valley, Calif. Application software 170, 190, on the other hand, can be any one of a variety of software applications, including word processing, database, spreadsheet, text editors, and the like.

B. Development System

Figure 2A:
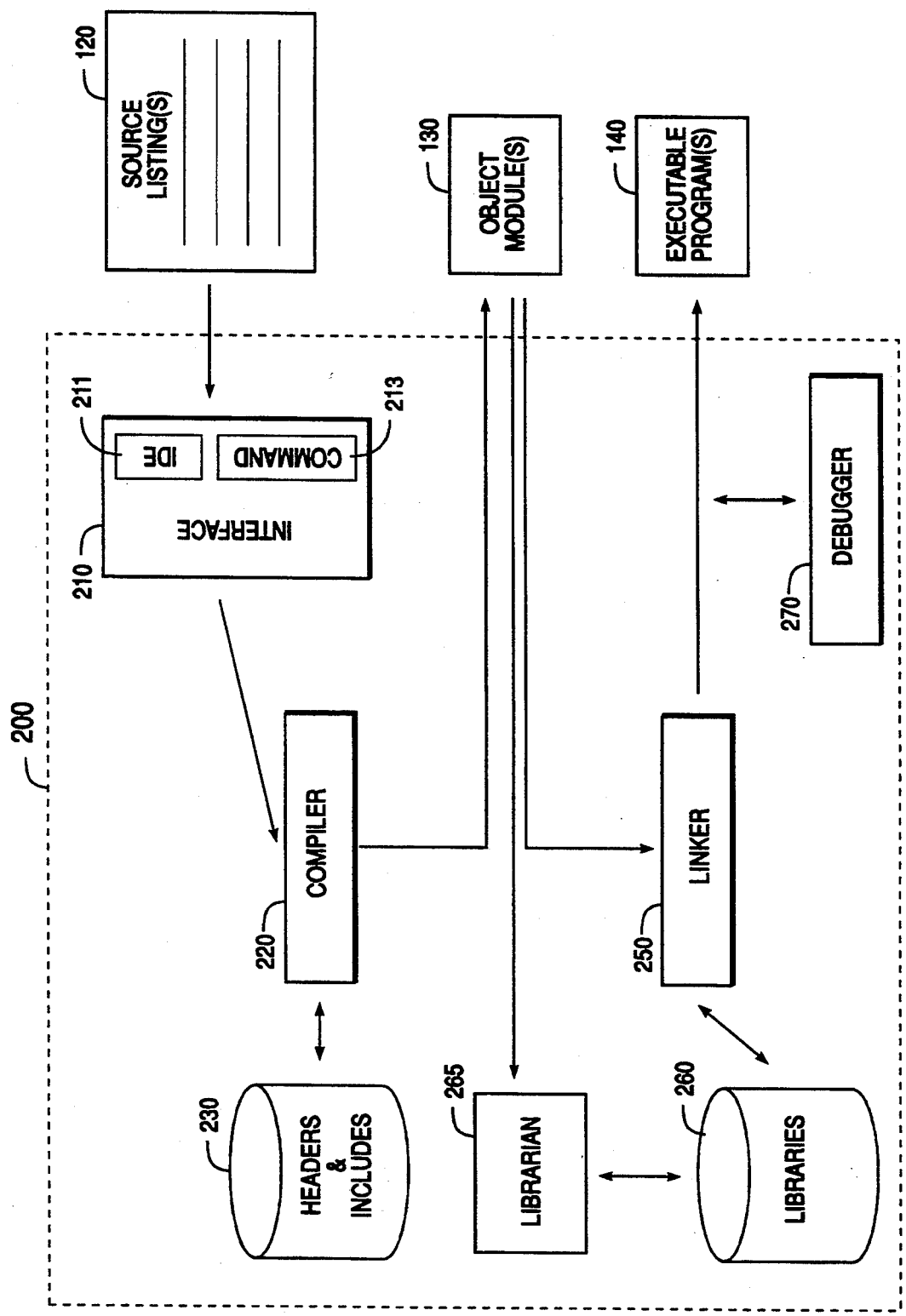
FIG. 2A is a block diagram of a development system of the present invention.
Figure 2B:
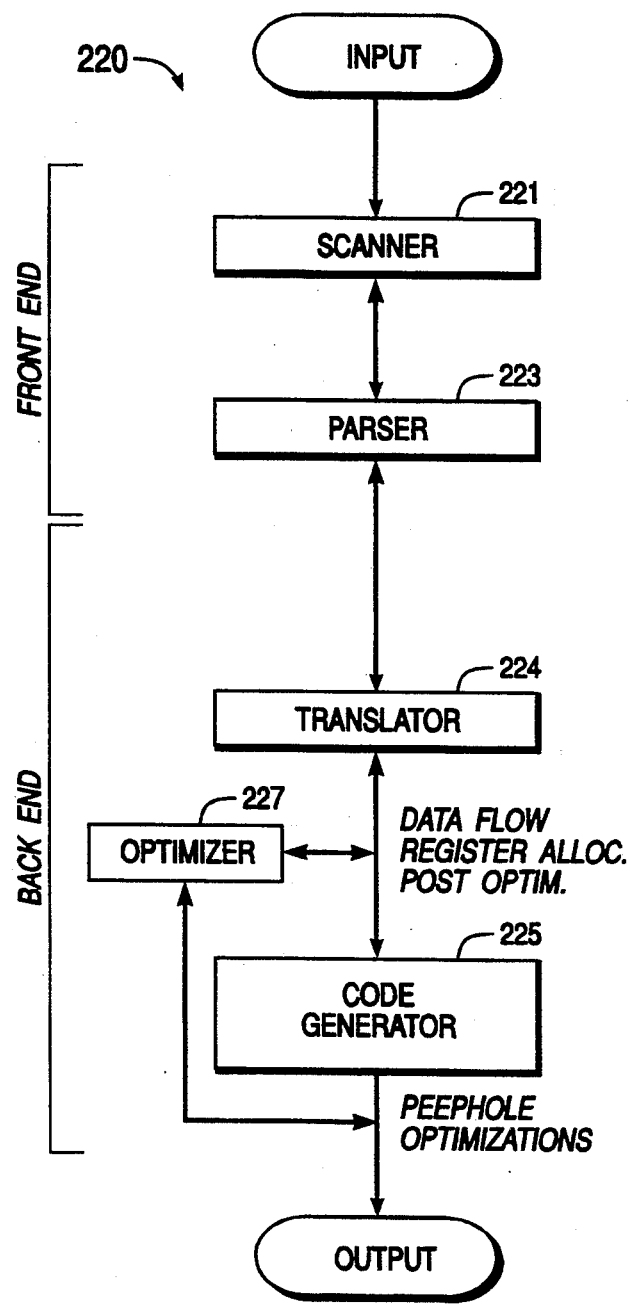
FIG. 2B is a flow diagram illustrating the process of the development system of FIG. 2A for compiling source modules into object code (modules).
Figure 2B:
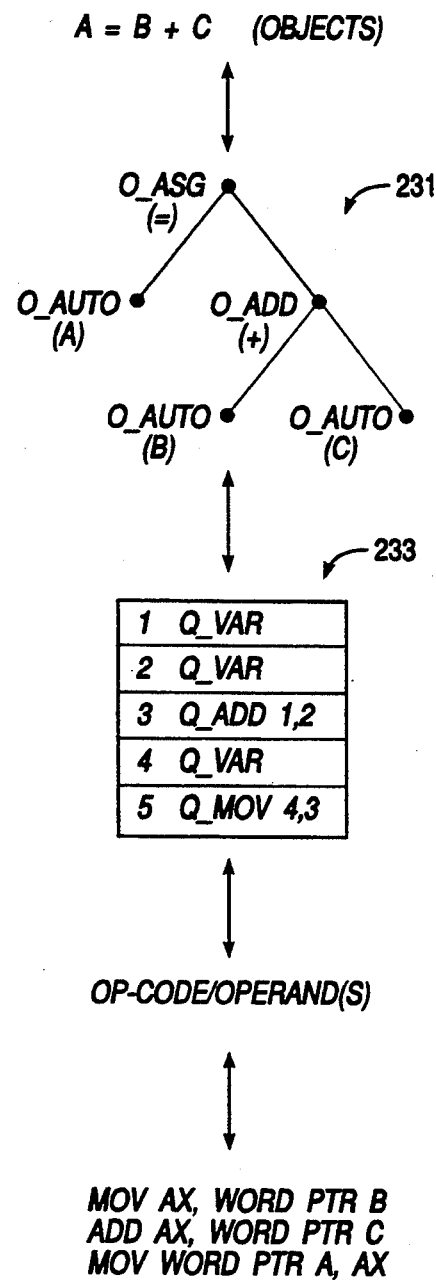

Shown in further detail in FIG. 2A-B, the development system of the present invention includes an optimizing compiler 220, a linker 250, and an interface 210.

Through interface 210, the developer user supplies source modules 120 to the compiler 220. Interface 210 includes both command-line driven 213 and Integrated Development Environment (IDE) 211 interfaces, the former accepting user commands through command-line parameters, the latter providing menuing equivalents thereof. From the source code 120 and header/include files 230, the compiler 220 "compiles" or generates object module(s) 130. In turn, linker 250 "links" or combines the object modules 130 with libraries 260 (e.g., graphics, I/O routines, startup code, and the like) to generate program(s) 140, which may be executed by a target processor (e.g., processor 101 of FIG. 1A). A debugging module 270 may be added, as desired, for tracking and eliminating errors in the programs 140.

Shown in further detail in FIG. 2B, the compiler 220 includes a front end and a back end. In particular, the front end includes a scanner 221 and a parser 223, while the back end includes a translator 224, a code generator 225, and an optimizer 227. In basic operation, the scanner 221 reads a source program and breaks it apart into a sequence of tokens, which include identifiers, delimiters, numbers, operators, and the like. In turn, the tokens are read by the parser 223, which understands the semantics of the source language. Given a formal syntax specification, such as a context-free grammar (CFG), the parser generates an intermediate representation (IR code) of the program, for example, by grouping tokens into units as specified by the syntax being used. In the syntax of the C programming language, for example, the expression $A=B+C$ tells the computer to add the values of B and C together to obtain a new value, which is assigned to A. As shown, the IR code may be provided to the back end as a derivation tree 231, with the parsed tokens accessible from nodes of the tree.

Next, the IR code is passed to the back end of the compiler for code generation. Upon receiving this (e.g., by receiving a pointer to the expression tree 231), the translator 224 reduces the IR code into a table(s) 233 of triples (i.e., three-address representation) or, more preferably, quadruples (i.e., three-address representation with intermediate values referenced by explicit names). Using appropriate op-code lookup tables, these quads are then mapped by the code generator 225 into the object code performing the specified operations.

In a preferred embodiment, the compiler 220 is Borland C++ compiler. For further discussion of the operation of compiler 220, the reader should consult the following manuals: (1) *Borland C++ User's Guide*, (2) *Borland C++ Programmer's Guide*, and (3) *Borland C++ Tools and Utilities Guide*, all available from Borland International. For a discussion of the optimizing features of the compiler, the reader may consult application Ser. No. 07/894,706. For a general introduction to the construction and operation of compilers, see Fischer et al., *Crafting a Compiler with C*, Benjamin/Cummings Publishing Company, Inc., 1991. The disclosures of each of the foregoing are hereby incorporated by reference.

Linking: Object Modules and Libraries

A. Object (OBJ) Modules

During creation of a program, individual translator outputs (i.e., outputs from compilers and assemblers) are linked together to create the executable program. The translator outputs or object modules ("OBJs") store a plurality of records describing the 80×86 object language used for input and output of object language processors, such as linkers and librarians. The order of the records is to some extent arbitrary.

The basic layout of an OBJ module and its records is defined by the Intel Object Module Format (OMF). As shown in FIG. 2C, an OMF object record 240 includes a Record Type (byte) 241, a Record Length (word) 242, a Contents (variable-length) 243, and a Checksum (byte) 244. Thus, each record includes a one-byte record type field for identifying the record and a two-byte field specifying the record length. This is followed by a contents field, which varies according to the particular record type. Finally, a checksum byte is added as a measure of integrity.

A particular advantage of this scheme is that the format is extensible. Specifically, a new record type can be added to the Object Module Format, including proprietary record types, without requiring redesign of the format. Records which are not recognized may be simply skipped. This feature of OMF is exploited by the system of the present invention, as will be described below.

Records commonly employed in the object module format may be grouped into the following format types:
Module Record Formats:
  Symbol Definition Records
    Public Names Definition Record
    Communal Names Definition Record
    Local Symbols Record
    External Names Definition Record
    Line Numbers Record
  Data Records
    Logical Enumerated Data Record
    Logical Iterated Data Record
    T-Module Header Record
    List of Names Record
    Segment Definition Record
    Group Definition Record
    Fixup Record
    Module End Record
    Comment Record While many types of records are available in the OMF standard, only five are of particular interest to the present invention. These include the Translation Header (THEADR) Record, Module End (MODEND) Record, Public Names Definition (PUBDEF) Record, Communal Names Definition (COMDEF) Record, and External Names Definition (EXTDEF) Record. Each of these will be explained briefly in turn.

Shown in FIG. 2D, the Translation Header or THEADR Record 250 (type=80h) serves to identify an object module's name and is, thus, a fairly simple record. It is useful for determining the source language and source file name of an OBJ module, which it stores in its contents field 253. The information, in turn, can be used to generate error messages, or identify a module in an object library. Indicating the start of a module, the record always appears as the first record in a module. As the counterpart to THEADR, the MODEND record (type=8Ah) always is the last record, for indicating the end of a module.

The OMF standard provides several record types containing symbol names (i.e., names of variables, routines, and other identifiers contained within a program) which subsequent records may reference. Of these, the PUBDEF records, COMDEF records, and EXTDEF records are employed to define globally-visible procedures and data items and to resolve external references. EXTDEF records provides a list of symbolic external references, that is, symbols which are referenced in the module but are defined elsewhere. EXTDEF Record 260 (type=8Ch), as shown in FIG. 2E, stores an external name (string) 263a and a type index (byte) 263b in its variable portion.

PUBDEF Record 270 (type=90h) declares a symbol to be available for use by all modules. As such, these records function in a complementary fashion to EXTDEF records. The variable portion 273 for the record stores a group index, segment index, frame number, public name, public offset, and type index.

The COMDEF Record 280 (type=B0h) is a Microsoft extension to OMF. Its variable portion 283 stores a communal name, a type index, data segment type, and communal length. The communal name field stores the name in the length byte/ASCII string format. The type index is typically set to zero (unless the record is referencing a TYPDEF record). The data segment type indicates whether the communal variable is "near" or "far" as that term is understood (to 80×86 programmers) to reference near (same) segment or far (different) segment memory locations. The communal length field indicates the amount of memory to allocate.

For a more detailed discussion of the Object Module Format standard, including Microsoft's extensions, the reader should consult: (1) 8086 *Relocatable Object Module Formats,* Intel Corporation, 1981; (2) *Microsoft C Developer's Toolkit Reference,* Microsoft Corporation, 1990; and (3) *The MS-DOS Encyclopedia,* Microsoft Press, 1988. The disclosures of each of the foregoing are hereby incorporated by reference.

B. Sample source and object files

Figure 3A:
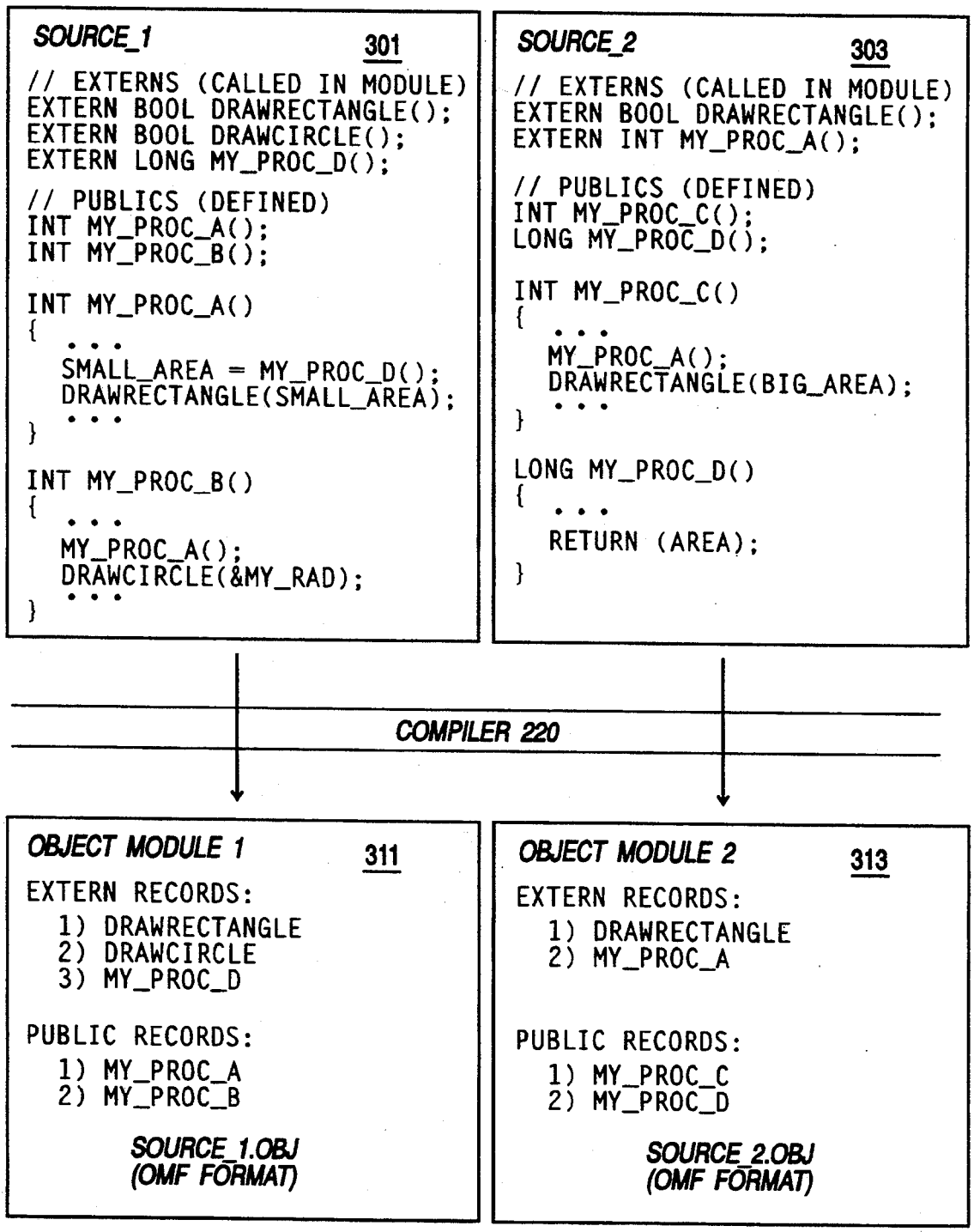
FIGS. 3A-B are diagrams illustrating the relationship between external and public symbols or identifiers in source modules and object modules; interdependencies between symbols is shown in particular detail in FIG. 3B.
Figure 3B:
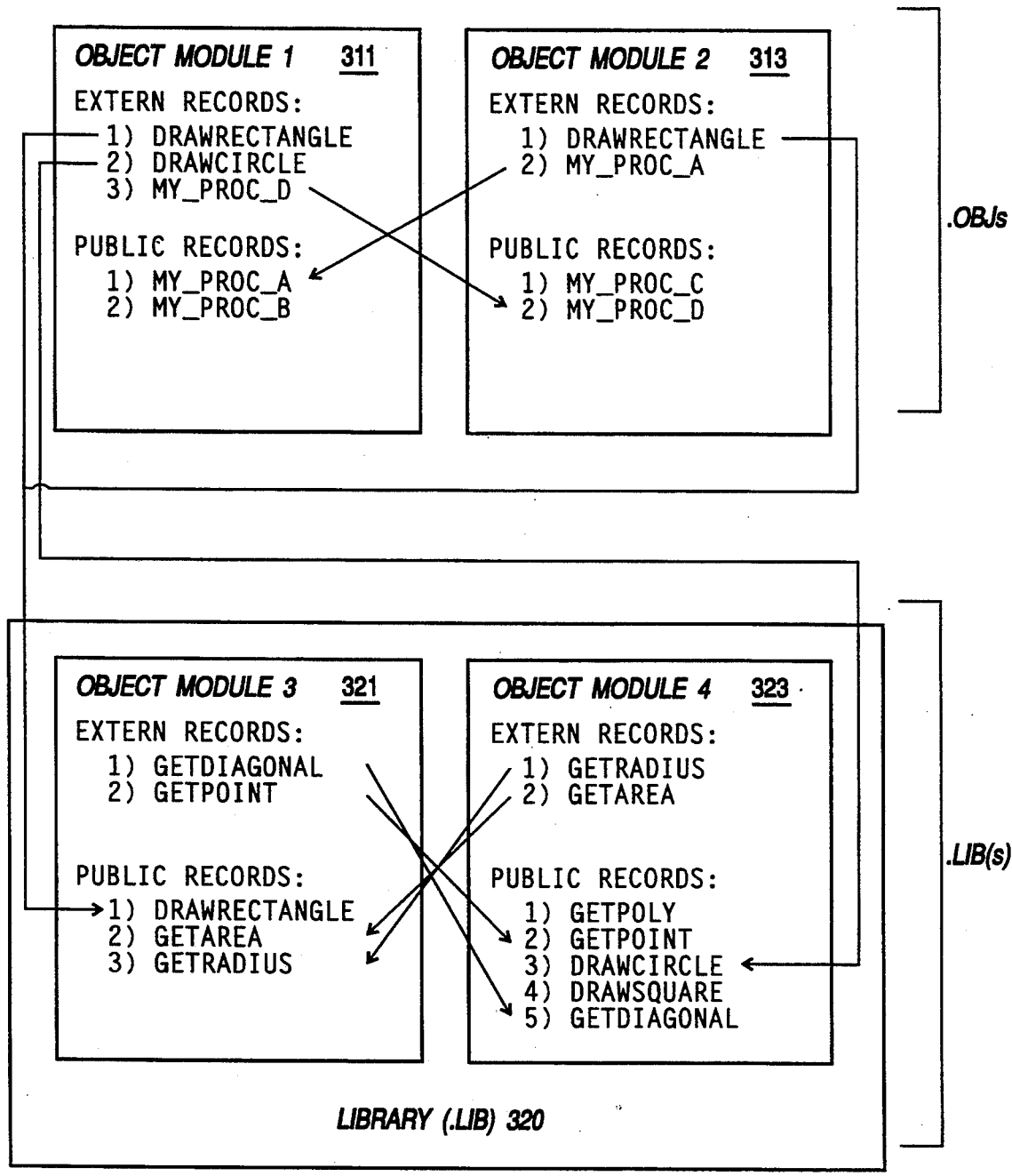

The relationship between symbols or identifiers in various source modules and their corresponding object modules is illustrated in FIGS. 3A–B. Source modules 301, 303 illustrate typical source code modules, such as would be supplied to the compiler 220 for generating modules of object code. Each module 301, 303 includes certain symbols which are "external" to the module and others which may be "public" to the module. In source 301, for instance, the routine MY_PROC_A is defined in that source module. As such, the routine is available for use globally (i.e., "public" visibility) within the source module 301.

Often, however, it is desirable to invoke routines which may be defined elsewhere (e.g., such as in a library file purchased from a third party vendor). As shown for the MY_PROC_A routine, for instance, a DRAWRECTANGLE routine is called. However, the DRAWRECTANGLE routine is defined elsewhere (i.e., the actual steps for the routine are set forth in a different module). Thus, the symbol "DRAWRECTANGLE" is "external" to the source module 301.

As shown by the object modules 311-313, the compiler 220 emits a particular record for a symbol, based upon whether it is an external or public reference. As shown for the object module 311, for example, references to DRAWRECTANGLE, DRAWCIRCLE, and MY_PROC_D are stored in the object modules as external records. On the other hand, the two routines defined in source module 301—MY_PROC_A and MY_PROC_B—are stored as public records. The object module which source module 303 compiles into is also shown (as object module 313).

All told, there are dependencies between the various modules which exist. FIG. 3B illustrates dependencies 350 which may exist, for example, for the object modules 311, 313. Source module 301 generates object module 311. The module 311 includes three external references: 1) DRAWRECTANGLE, 2) DRAWCIRCLE, and 3) MY_PROC_D. The first two externals are satisfied by a library file 320, which itself is comprised of a plurality of object modules (e.g., object modules 321, 323). The third external reference (MY_PROC_D) is satisfied by the companion object module 313; that is, the module 313 includes a public record for MY_PROC_D which satisfies the corresponding external record for the object module 311. As shown by FIG. 3B, a multitude of interdependencies may exist, all of which must be satisfied during linking to create a valid executable program.

C. Libraries

Figure 3C:
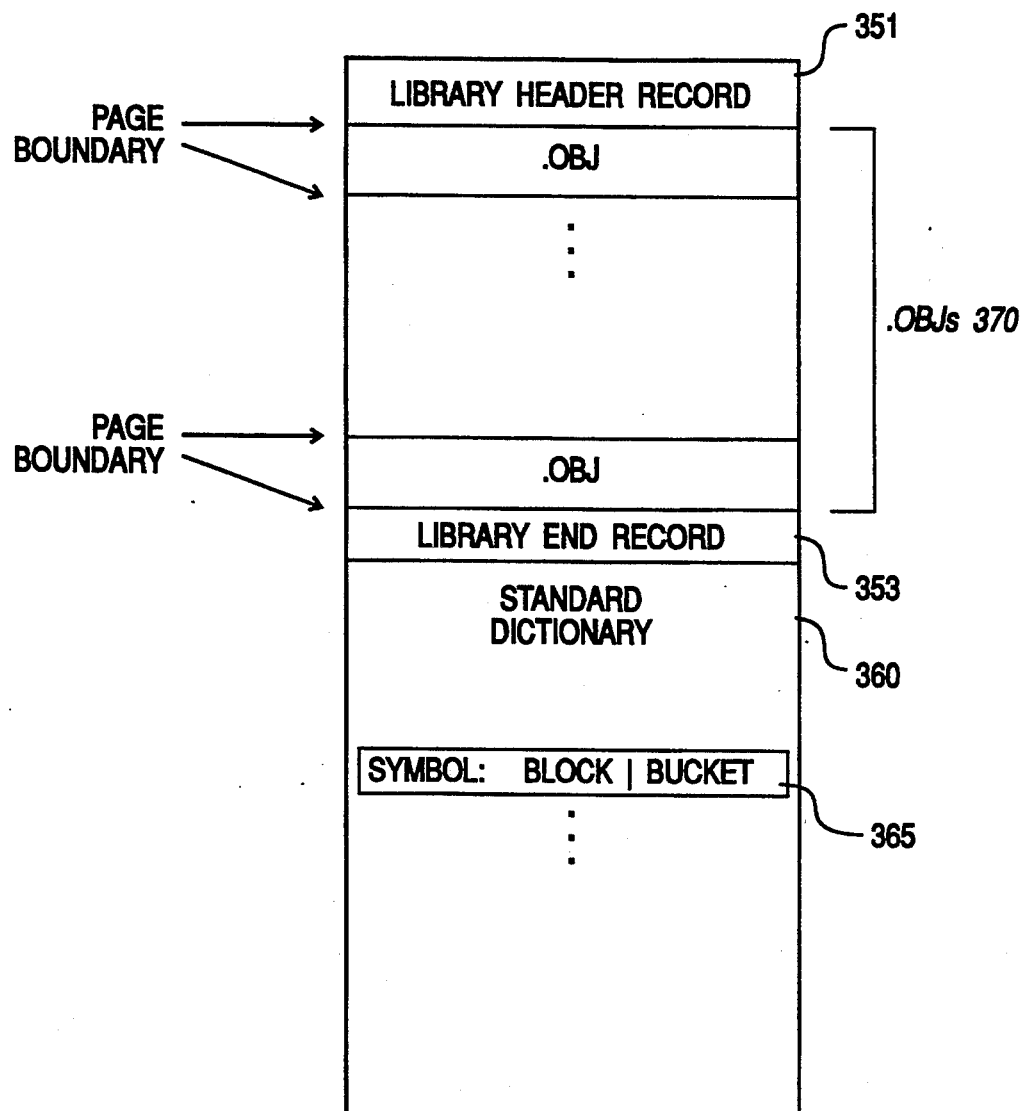
FIG. 3C is a block diagram illustrating the layout of a typical library (.LIB) file, which includes a Standard Dictionary.

Object (OBJ) files may be placed by the Librarian 265 (of FIG. 2A) in a single "library" (.LIB) file for collective storage. An exemplary library format is that provided by Microsoft for MS-DOS. In general layout, a Microsoft MS-DOS library file is constructed in a manner similar to that of the above-described Intel object module—it comprises a plurality of records, most of which will be one of the aforementioned object record types. As shown in FIG. 3C, a library 350 essentially comprises a collection of object modules 370 followed by a Standard Dictionary 360. This layout will now be described in greater detail.

The first record in the library 350 is a Library Header Record 351. The record very much resembles other Object Module Format records. Its type, the first byte, is set to F0h; this is followed by two (or more) bytes specifying the length which remains in the record. The record length field specifies a "page size" for the library. Object Modules stored in the library, such as .OBJ modules 370, are always positioned at the beginning of the page. Next are four bytes specifying the byte offset within the library for the start of the first block of the Standard Dictionary (described below). This is followed by two (or more) bytes which specified the number of blocks in the dictionary. Finally, a Flags byte describes attributes or features of the library (e.g., case sensitivity). The remaining bytes in the record are not significant.

Immediately following the header record are the object modules 370 for the library; these are stored successively. Each module is in OMF layout, with individual modules being aligned so that each one begins at a new page or block; padding is added as necessary. Following the last object module in the library is a Library End Record 353, which serves as a marker between the object modules 370 and the dictionary 360.

The remaining blocks in the library comprise the Standard Dictionary 360. The dictionary includes a list of the library's public symbols and module names. From a symbol stored in the list, one may determine a file offset for the module containing that symbol in the library. In the system of the present invention, this format of the Standard Dictionary is extended to support Extended Dictionary processing, as described hereinbelow.

Linker Operation

A. General operation

Figure 4A:
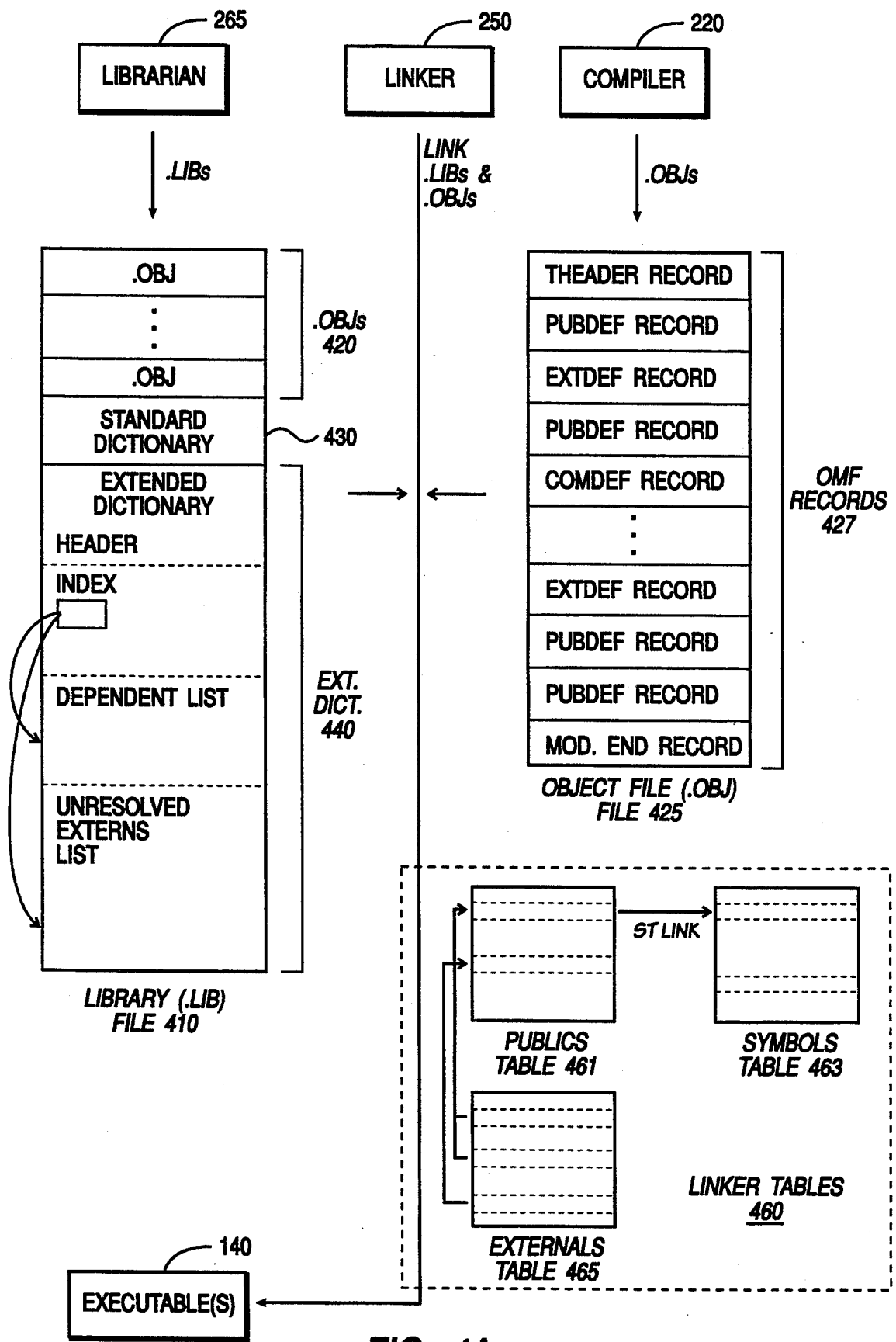
FIG. 4A is a block diagram which illustrates the functional relationship of data members created and maintained by the development system of FIG. 2A.
Figure 4B:
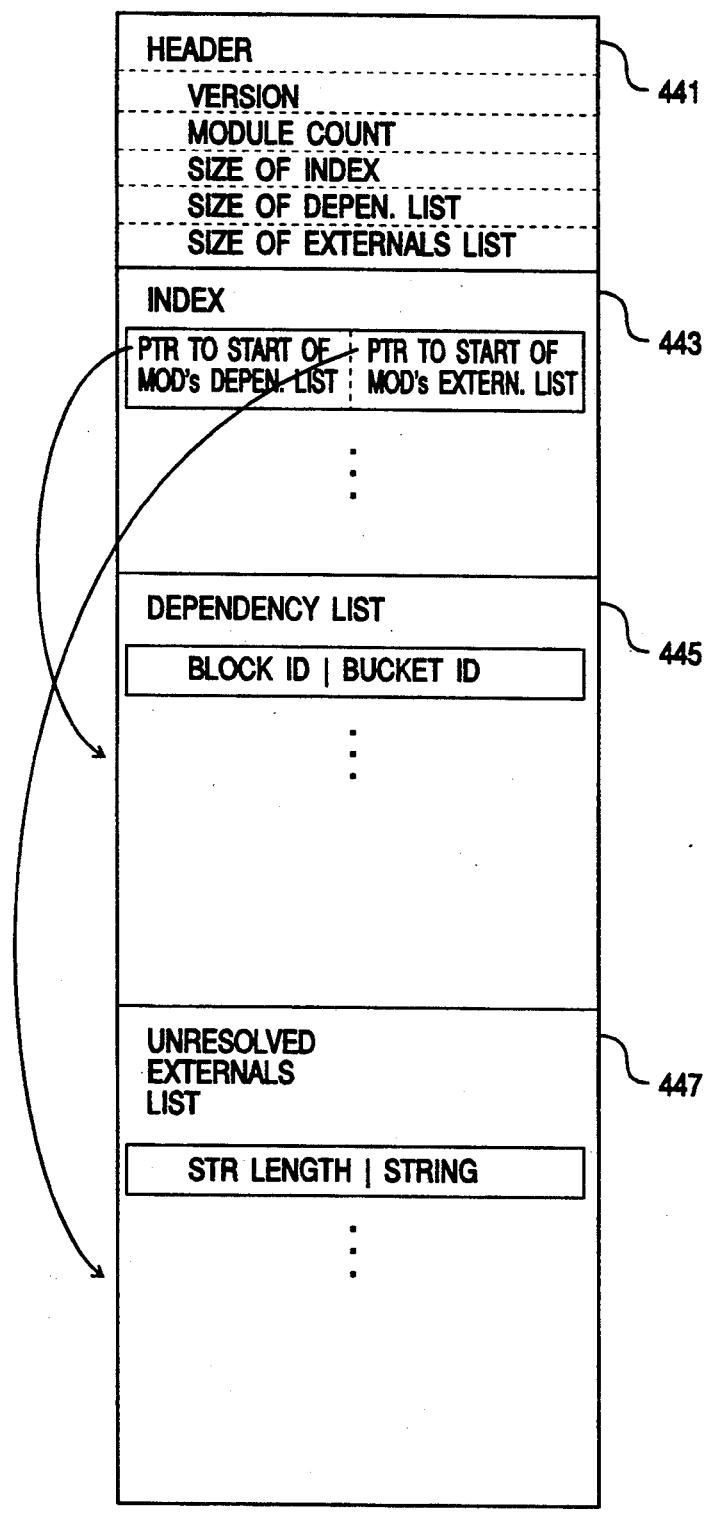
FIG. 4B is a block diagram illustrating an Extended Dictionary of the present invention.
Figure 4C:
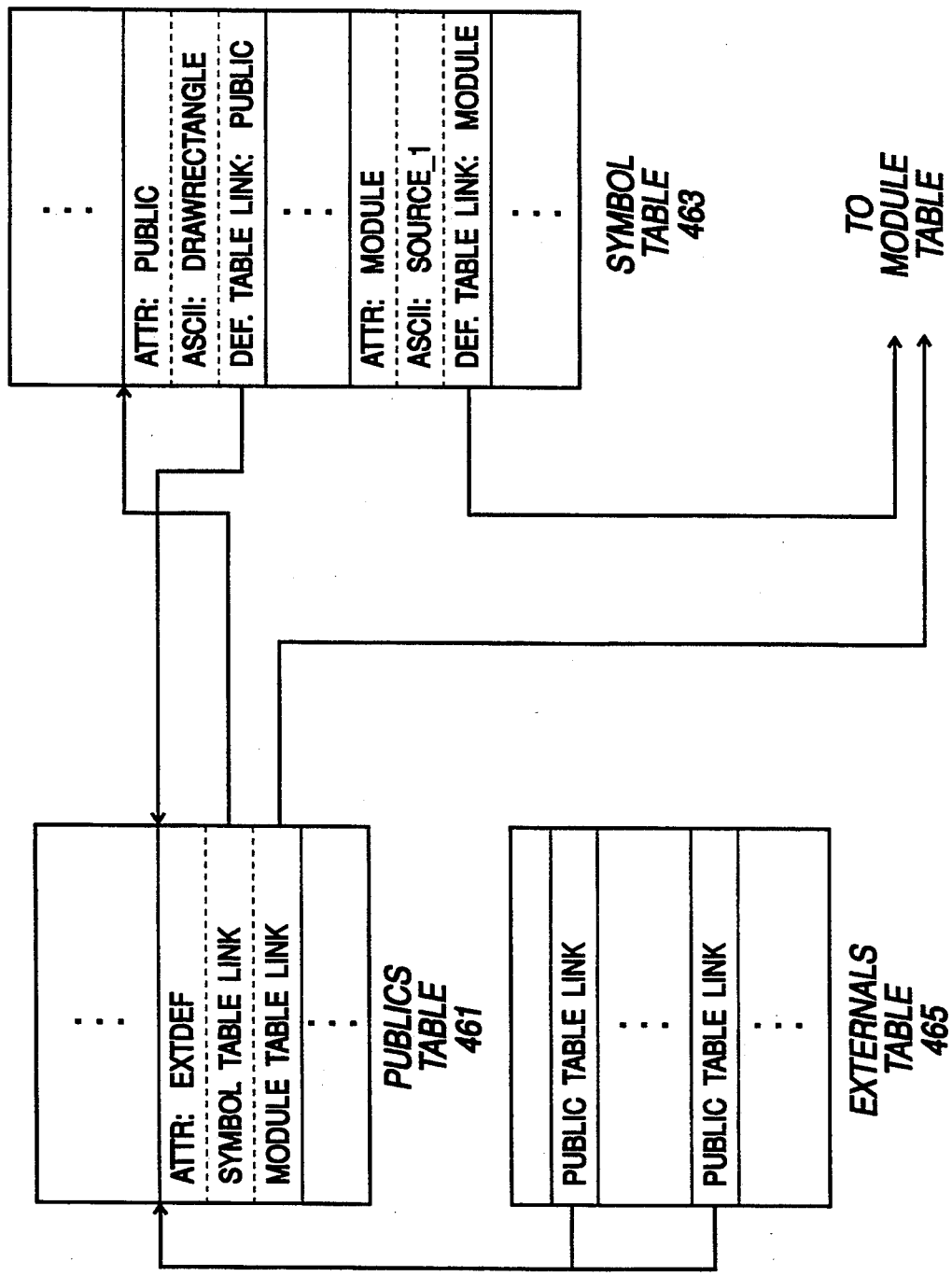
FIG. 4C is a block diagram illustrating the functional relationship between internal linker tables.

Referring now to FIGS. 4A–C, the general operation of the linker 250 will now be described. Linker 250 is a two-pass linker. When invoked, the linker receives a list of object module file names (i.e., a list of .OBJs which have been compiled by compiler 220) and a list of library file names (i.e., a list of .LIB(s)); these are modules desired to be included in the link. In FIG. 4A, for instance, the linker may be instructed to link object file 425 to library file 410, to generate executable program 140.

As a more specific example, a developer user may create a Windows application executable from the following command line:

```
tlink/Tw /c \BORLANDC \ lib \ cOws winapp1
   winapp2, winapp, winapp,
      BORLANDC \ lib \ cws\ BORLAND-
   C \ lib \ import, winapp.def
``` where the /Tw option tells the linker (TLINK) to generate Windows executables; the /c option tells the linker to be casesensitive during linking; \BORLANDC \ LIB \ COWS is a standard Windows initialization object module and WINAPP1 and WINAPP2 are the module's object files (for all three files the .OBJ extension is assumed); WINAPP.EXE is the name of the target Windows executable; WINAPP.MAP is the name of the (optional) map file; \ BORLAND-C \ LIB \ CWS specifies the small memory model runtime library for Windows and \BORLAND-C \ LIB \ IMPORT is a library that provides access to the built-in Windows functions; and WINAPP.DEF is the Windows module definition file used to specify additional link options. For additional information concerning general parameters and command-line switches for the linker 250 and the librarian 265, one may consult the above-mentioned *Borland C++ Tools and Utilities* (Chapter 4: TLINK, and Chapter 3: TLIB).

In general operation, the linker proceeds to scan the object module files (e.g., OBJ 425) specified in the list in a first pass. Next, the linker scans the object modules contained in the library files which have been specified (e.g., OBJs 420 of library 410). During the first pass, the linker gathers sufficient information to determine requirements for creating the executable, such as memory resources which are required by internal tables for the link operation.

After processing all of the object module files and library files in the first pass, the linker begins an intermediate operation or a "middle pass." During this stage, the linker determines which of the object modules contained in the library files are actually necessary to the link. A module is marked as "needed" if it contains one or more PUBDEF or COMDEF Records that have been referenced via an EXTDEF Record in another object module. With Extended Dictionary processing of the present invention, this determination (of resolving which modules are needed) can be made during the first pass.

Upon completion of the middle pass, the linker proceeds to the second pass. The pass involves reprocessing all of the object modules contained in the object files and any of the object modules contained in the library files but only for those which were marked as "needed" during the middle pass. Any object modules in libraries that are not needed are skipped (i.e., not read into memory) during the second pass. As the object modules are processed, the executable image 140 is constructed and emitted.

Without Extended Dictionary processing, linking incurs substantial processing time and resources (particularly during the first pass) for handling object modules which are ultimately not needed in the link. During the middle pass, considerable amount of processing time is expended in determining exactly which library object modules are needed in the link (i.e., which modules can be ignored during the second pass). If the library object modules which are needed are known beforehand (i.e., before the libraries are read in the first pass), both processing time and internal storage requirements may be substantially reduced. Such a modification would result in a link which is not only faster but also includes greater capacity.

B. Linking with Extended Dictionary support

1. Modification to the Standard Dictionary

Standard Dictionary 430 of Library 410 is modified from the Microsoft standard for the MD-DOS library format. Entries of the dictionary 430 are structured as follows. The first byte stores the length of the symbol to follow; this is followed by the bytes of text for the symbol. Next, a word field (two bytes in byte-swapped order) specifies the page number at which the module defining the symbol begins; the library header is counted as the 0th page.

Following the page number word field there are either two or three additional bytes of information generated by the librarian 265 to support Extended Dictionary processing. The additional information in the Standard Dictionary does not strictly conform to the Microsoft standard for the MD-DOS library format. Since symbols in the Standard Dictionary are obtained by a random access method using a page address scheme (block or page/bucket index), the information is essentially "hidden". The additional data bytes stored at the end of the symbol are not detected by other manufacturer's librarian tools.

The additional data bytes function as follows. If the symbol is a public symbol, the next three bytes are essentially a pointer into the Standard Dictionary to the name of the module which defines the public. The first two bytes are a byte-swapped word field that specifies the page number (index to a standard dictionary block) and the next byte is a bucket index (pointer to symbol string in the standard dictionary block); thus, this data functions essentially as a pointer to the module name of the module that defines the public symbol. If the symbol is a module name, the next two bytes are a module number. This data is essentially an index (via the Extended Dictionary Index) into the Dependency Lists and Unresolved Externals List for the module.

2. The Extended Dictionary

As shown in FIG. 4A, the library file 410 includes an Extended Dictionary 440 of the present invention. Positioned at the end of the library (i.e., after the Standard Dictionary), the Extended Dictionary indicates interdependencies among modules within the library and lists externals that are not resolved by the modules stored in the library itself.

Shown in further detail in FIG. 4B, the Extended Dictionary 440 includes a Header 441, an Index 443, a Dependency List 445, and Unresolved External List 447. The Header 441 stores housekeeping information for the Extended Dictionary. It is structured as follows:

| Extended Dictionary Header | |
|---|---|
| word | version signature |
| word | module count |
| word | size (in bytes) of index |
| word | size (in bytes) of dependency list |
| word | size (in bytes) of unresolved externals list |

The version signature is for internal tracking of different versions. The module count indicates the total number of object modules in the library file.

The Index 443, which serves as a directory into the Dependency List 445 and the Unresolved Externals List 447, includes two pointers: a Dependency pointer and an Externals pointer. The former is a pointer to start of the module's dependency list (relative to start of dependency list). The value of −1 (e.g., 0×FFFF when two-byte pointers are employed) is defined to indicate that no modules of the library are referenced by this module. The latter is a pointer to start of module's unresolved externals list (relative to start of unresolved externals list). Again, the value of −1 is specially defined, here indicating that no unresolved externals are referenced by this module.

Of particular interest in the Extended Dictionary 440 is its pair of lists 445, 447. The Extended Dictionary Dependency List 445 stores a block/bucket entry for each module it needs. An entry may be structured as follows.

| | |
|---|---|
| word | module name block ID (−1 signals end of list) |
| byte | module name bucket ID |

The Extended Dictionary Unresolved Externals List 447 functions in a somewhat similar manner. For each module, the list stores a string for indicating each unresolved externals of the module. Each entry may be structured in byte length/string format as follows.

| | |
|---|---|
| byte | string length (0ffh followed by 0ffh as first byte of ASCII string (i.e., 0ffffh or −1) signals end of list) |
| byte(s) | ASCII string |

3. Internal linker tables

During the process of linking object modules and creating an executable image, the linker creates and maintains many internal tables (tables 460). However, only three tables are of interest with respect to the extended dictionary processing of the present invention. These tables are the Symbol Table 463, the Publics Table 461, and the Externals Table 465. Each will be described next, with particular reference to FIG. 4C.

The Symbol Table 463 contains all symbols encountered in the various OMF records. Each entry in this table includes a text attribute, hash link, definition link, symbol string length, and the ASCII symbol string. Such an entry may be constructed as follows.

| SYMBOL TABLE FORMAT | |
|---|---|
| byte | attribute |
| | public |
| | module |
| | dll |
| | other (segment, group, class) |
| word | hash link |
| word | definition Table link |
| | (Public, Module, DLL, Segment, etc.) |
| byte | length of text string |
| byte(s) | text string (variable length) |

The attribute specifies what type of symbol is stored in the entry. A module symbol is flagged as a module symbol. PUBDEF, COMDEF, and EXTDEF symbols, on the other hand, are defined to have a text attribute of "public". The hash link is an internal data entry used by the symbol table for hashing. For module symbols, the definition Table link is set to point to the Module Table. For public symbols, the definition table link is set to an entry in the Publics Table.

The Publics Table 461 contains an entry for every unique symbol encountered in the EXTDEF, PUBDEF, or COMDEF OMF records of the object modules. Such an entry may be constructed as follows.

| PUBLICS TABLE FORMAT | |
|---|---|
| word | Segment Table link |
| word | Module Table or DLL Table link |
| double word | true offset relative to segdef.segoff |
| word | stub offset |
| word | next stub offset link |
| word | Instance Table link |
| word | Symbol Table link |
| byte | attribute bits as follows: |
| | Used, Absolute, Local, Comdef, Extdef, DLL, Warned, Exported |
| double word | debug type index |
| word | debug symbol index |
| word | Module Table link to type def info originating module |

Each entry in the table includes attribute bits and debug information, and links to various other tables. COMDEFs are linked to a public entry and to each other via the Instance Table link. The Module Table link indicates the defining module for publics. The Symbol Table link points to the ASCII string for this "public". The various attribute bits are set and cleared in the process of processing PUBDEF, COMDEF, and EXTDEF records (as described below).

The Externals Table 465 contains an entry for every EXTDEF OMF record encountered in the object modules. In comparison to the other tables, its format is rather simple.

Each entry in the table simply includes a link to the corresponding entry in the Publics Table.

Although the linker processes all OMF records contained in the object modules in the process of creating an executable module, there are only five records of interest with respect to the Extended Dictionary processing of the present invention. These records include THEADR, MODEND, PUBDEF, COMDEF, and EXTDEF records. The processing of these records will now be described with reference to the internal linker tables—internal data structures employed during the link.

For each valid THEADR/MODEND record pair encountered while processing object modules, the linker inserts a symbol record (with attribute set to module) in the Symbol Table; inserts a module record in the module table; and initializes the Symbol Table Definition Link to the module record in the module table. For each PUBDEF, COMDEF, and EXTDEF record encountered during the first pass, the linker inserts a public symbol in the Symbol Table. If the Symbol Table Definition Link is uninitialized (i.e., this is the first occurrence of this particular symbol), the linker inserts a public record in the Publics Table, and initializes the Symbol Table Definition Link to point to the public record in the Publics Table. Also at this time, the public record attribute bits are initialized to allow the linker to distinguish among PUBDEF, COMDEF, and EXTDEF record types. If the Symbol Table Definition Link has been previously initialized, however, the linker merely retrieves the public record from the Publics Table. If the current OMF record is a COMDEF record, an instance record is inserted in the instance table and the instance link is updated. If it is an EXTDEF record, an external record is inserted in the Externals Table. If it is a PUBDEF record (and the attribute bits are not already set to public), then the linker updates the attribute bits.

4. Extended Dictionary processing

During the first pass, after all of the object module files have been processed and before the library files are read, Extended Dictionary processing is performed. In general, this includes scanning an internal table which contains information cached from all of the EXTDEF records which were encountered up to this point in the link (i.e., EXTDEFs from .OBJ files). Using this table, the linker is able to determine which externals have not yet been resolved.

The linker searches for each of the unresolved external symbol names in the standard dictionaries of the libraries. Whenever an external symbol name is found in the Standard Dictionary of a library, the linker uses the information stored both in the Standard Dictionary and the Extended Dictionary to determine which module(s) from the library must be included in the link (in order to resolve the external symbol). Once the search for all unresolved externals is complete, the linker continues the pass by reading the library object modules specified in the library list. As the libraries are processed, however, only the object modules which have been determined to be necessary to the link are actually read; the other modules are skipped. Once the first pass has completed, the linker proceeds to the middle pass and second pass as previously described.

Figure 5A:
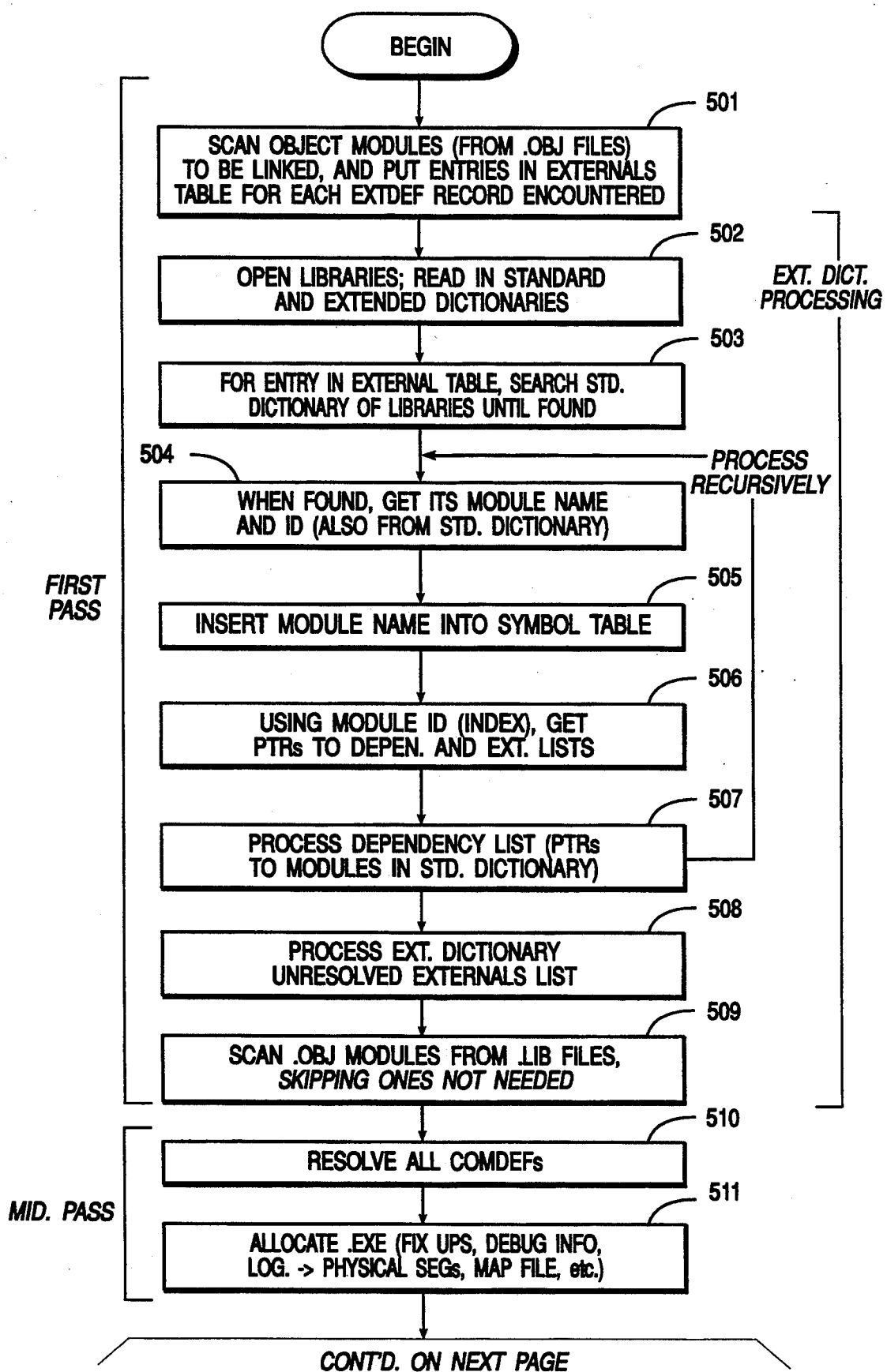
FIG. 5A is a general flowchart illustrating a method of the present invention for linking compiled object modules with Extended Dictionary support.
Figure 5A:
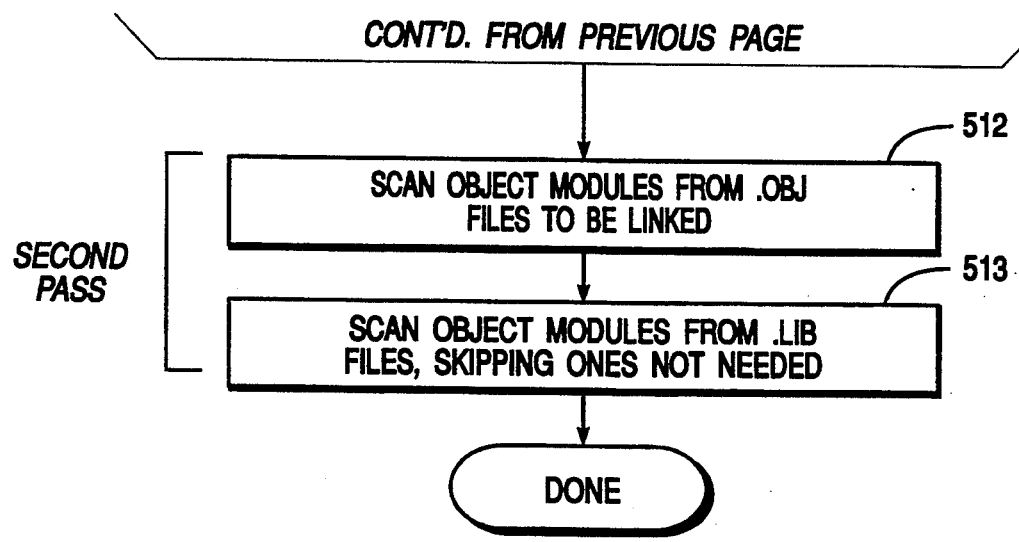
Figure 5B:
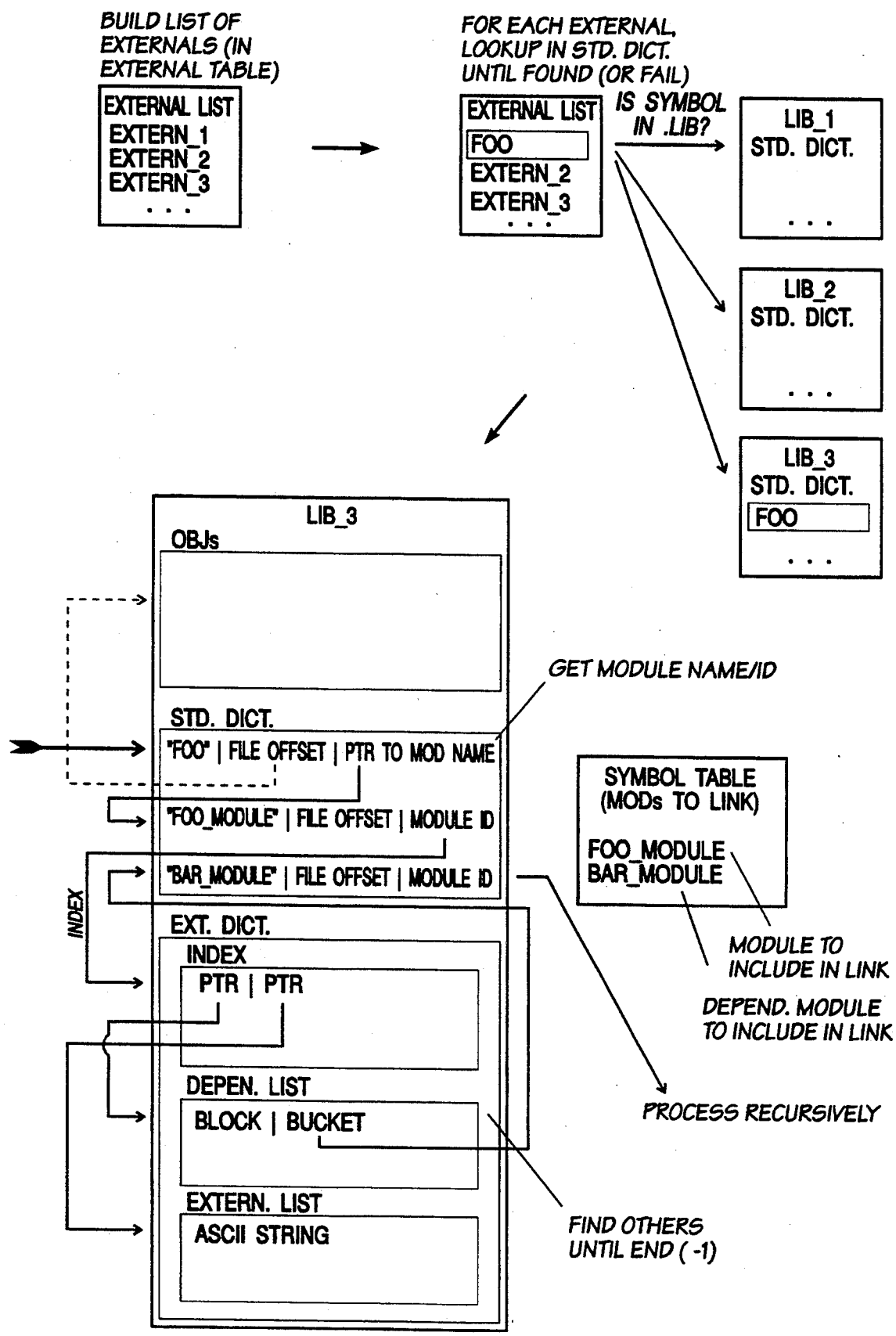
FIG. 5B is a block diagram illustrating the operation of the method of FIG. 5A, with regard to data structures employed by the system.
Figure 6A:
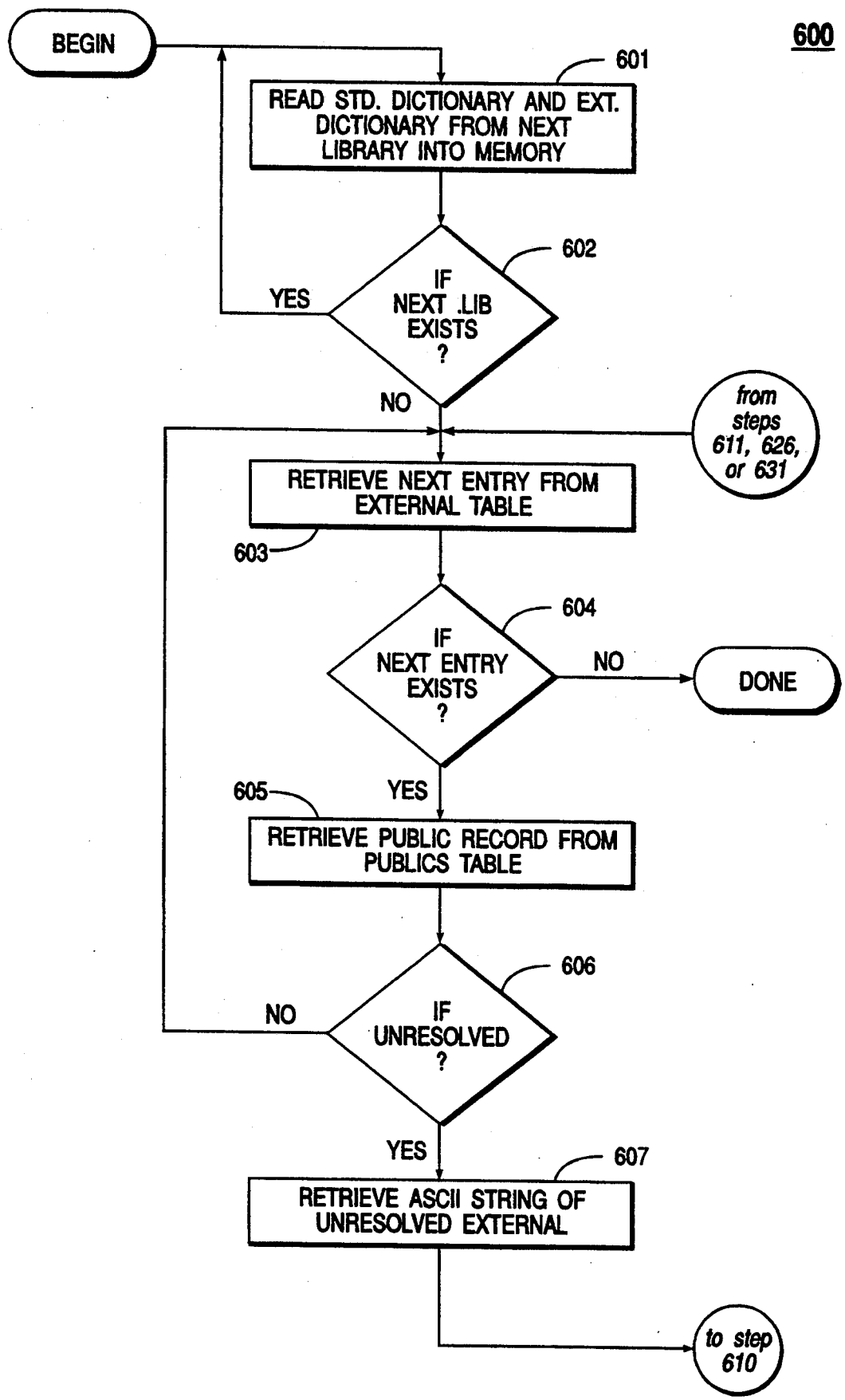
FIGS. 6A-D comprise a detailed flowchart illustrating a method of the present invention for linking compiled object modules with Extended Dictionary support.
Figure 6B:
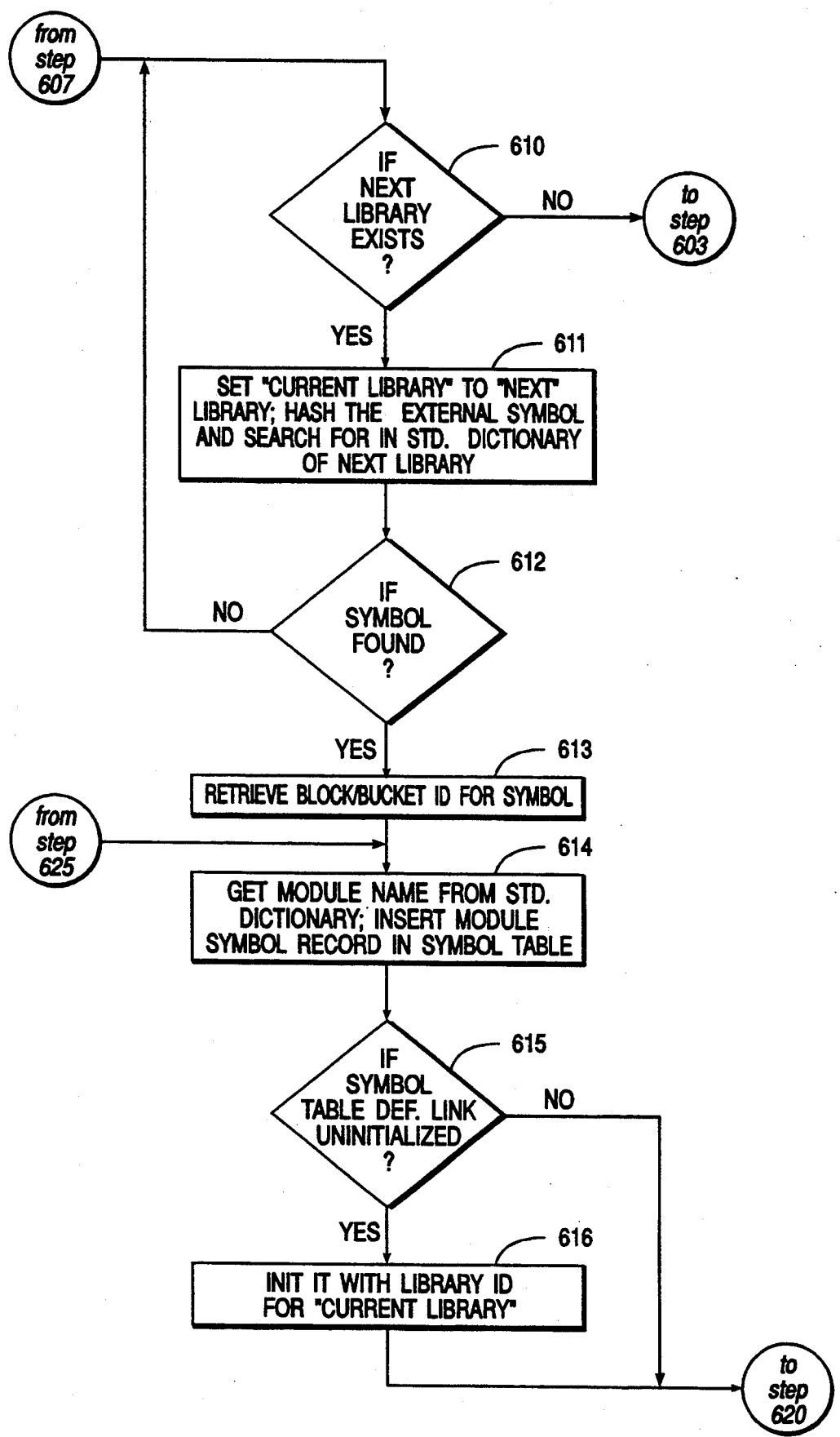
Figure 6C:
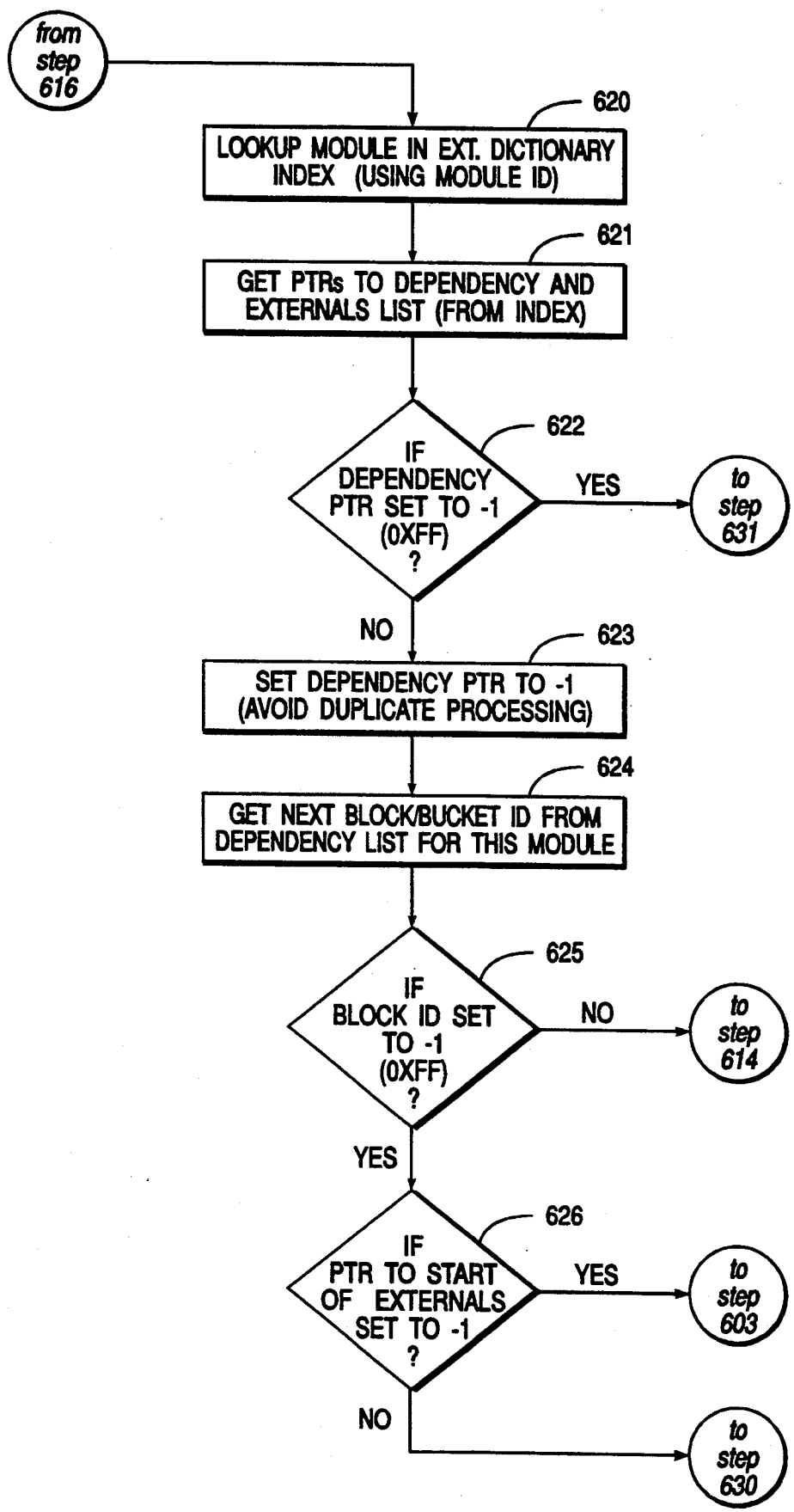
Figure 6D:
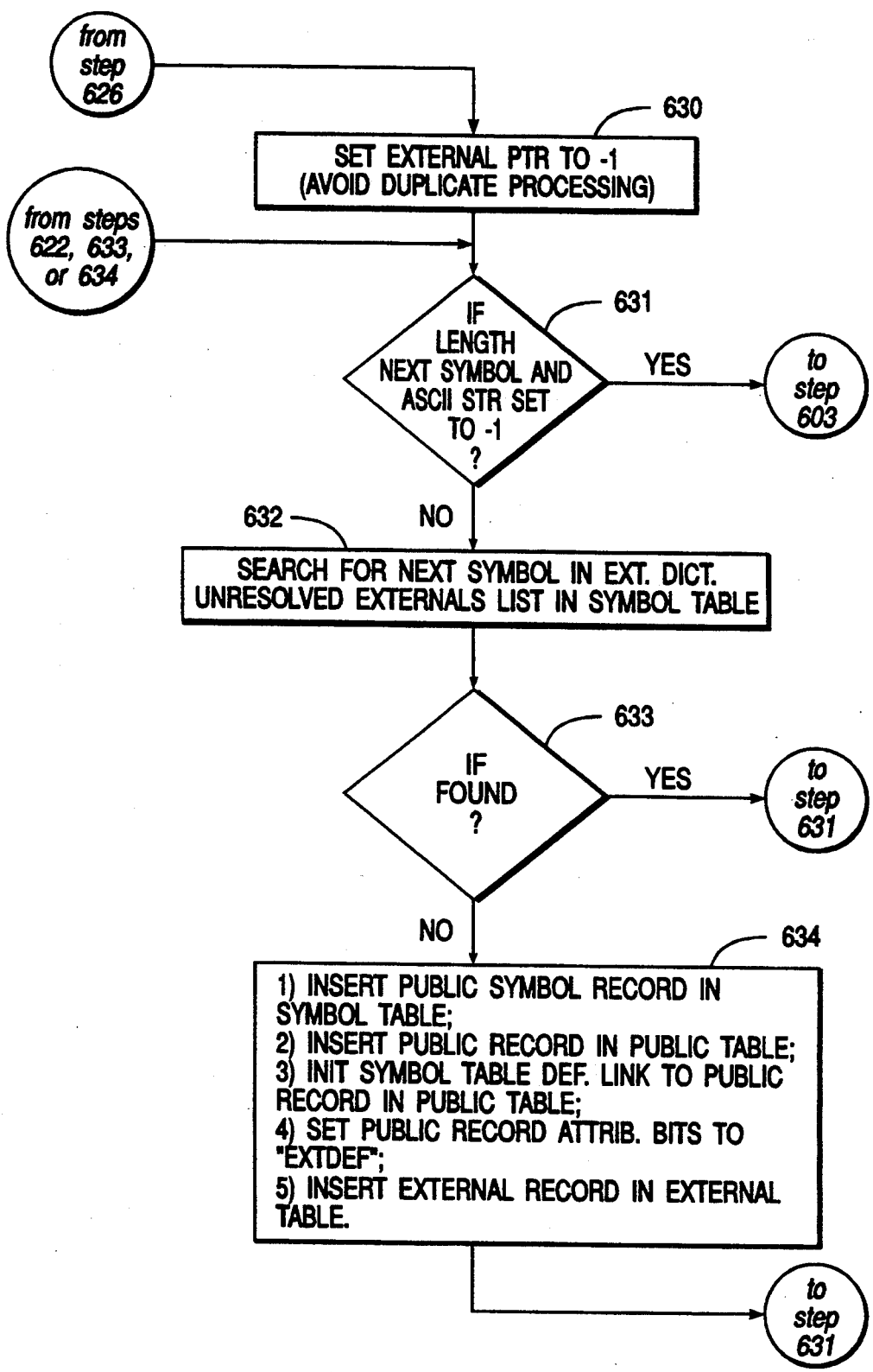

Referring now to FIGS. 5A–B, a method of the present invention for linking with Extended Dictionary support is summarized. FIG. 5A is a flowchart highlighting the major steps of the method. FIG. 5B is a block diagram of data structures employed by the system during the method; it should be read in conjunction with FIG. 5A.

The steps of the method are as follows. In step 501, the method scans object modules from the object files to be linked; in the process, the method places an entry in the Externals Table for each EXTDEF record encountered. At step 502, the method opens all of the libraries (specified in the list of libraries), and reads in the standard and extended dictionaries. At step 503, starting at the top of the Externals Table, the method processes each entry (unresolved external) by searching the standard dictionary of all libraries until the external is found. When the name is found (in the standard dictionary of a library), the name is used to get the module name and ID (for this external). As shown in FIG. 5B, for instance, an entry of "FOO" in the standard dictionary includes a pointer to the module name for "FOO'-'—"FOO_MODULE", as shown in the figure.

Next, the module name is inserted into the symbol table (with its attribute set to module) at step 505. At step 506, using the module ID (which functions as an index into the extended dictionary index, pointers to the dependency list and unresolved externals list for this module are extracted. At step 507, the method recursively processes the dependency list. Specifically, each entry in the dependency list in turn references a module name in the standard dictionary; the method repeats steps 504–507 for this module (e.g., such as module "BAR_MODULE" in FIG. 5B). This recursion causes all of the modules that are needed to be listed (at step 505).

After processing the dependency list, the method proceeds to step 508 to process the unresolved externals list (of the extended dictionary). Here, each of the externals is looked up in the symbol table and if not found then processed (as described in detail at step 634 hereinbelow). At step 509, the method scans the object modules from the library files and skips any object modules which are not needed. Thus, extended dictionary processing allows for unneeded object modules of libraries to be skipped during the first pass.

At step 510, the method begins the middle pass. At that step, COMDEF records (i.e., multiple publics) are resolved. At step 511, the physical layout of the executable image is built (i.e., allocating the .EXE); for instance, all logical segments are converted into physical segments, a map file is produced, and debug information is initialized. Finally, the second pass is completed by scanning the object modules from the .OBJ files to be linked at step 512 and scanning the object modules from library files at step 513, skipping any ones which are not needed.

The Extended Dictionary processing of FIG. 5A will now be described in further detail, with reference to method 600 of FIGS. 6A–D. The method includes the following steps:

Step 601: Read the Standard Dictionary and Extended Dictionary from the "next library" into memory (at the outset "next library" is initialized to the first library).

Step 602: If no next library exists, go to the next step; otherwise, go to step 601.

Thus, the step pair 601, 602 makes sure that the dictionaries for all libraries specified to be included in the link are read into memory.

Step 603: Retrieve the "next entry" from the Externals Table (upon first invocation, "next entry" is initialized to the first entry).

Step 604: If a next entry does not exist (no at step 604), then the method is done. Otherwise (yes at step 604), proceed to step 605.

Step 605: Retrieve the public record (for the external reference currently under examination) from the Publics Table, as specified by the Public Table link.

Step 606: If the retrieved record has already been resolved as indicated by its attribute bits (no at step 606), then go to step 603. Otherwise, proceed to step 607.

Thus, the steps 603–606 scans through the Externals Table; no processing is undertaken for externals which have already been resolved.

Step 607: An external has been found which has not yet been resolved, use the Symbol Table link in the public record to retrieve the name (ASCII string) from the Symbol Table of this unresolved external.

Step 610: If a next library does not exist (no at step 610), then go to step 603 (to get the "next entry" from the Externals Table). Otherwise, proceed to step 611.

Step 611: Set the "current library" to the "next library". Hash the external symbol and search for the string in the Standard Dictionary of the "current library".

Step 612: If the symbol is found, then go to step 613. Otherwise (no at step 612), go to step 610.

Thus, steps 610–612 continue to loop until the symbol is found in a library (yes at step 612) or all libraries have been searched (no at step 610), which ever occurs first.

Step 613: Retrieve the module block/bucket ID (pointer) for the found symbol.

The block/bucket ID serves as a pointer which points to the module name in the Standard Dictionary.

Step 614: Retrieve the module name and module ID from the Standard Dictionary using the block/bucket ID. Insert (or just lookup, if already exists) a module symbol record into the Symbol Table, with the record being flagged as a module name.

Step 615: If the Symbol Table Definition Link is uninitialized (i.e., if the name has never existed in there as a module name), then proceed to the next step. Otherwise, skip to step 620.

In most instances, module names point to entries in the module table but in this case a library ID is stored so that the library file from which the symbol originated can be determined. At this point, the module name has been stored in the Symbol Table. Thus, in the second pass, as object modules are encountered the system looks up the module name in the Symbol Table. If the module name is found, then the module is read into memory; otherwise, it is skipped.

Step 616: Initialize the Symbol Table Definition Link with the library ID for the current library.

Step 620: Look up the module in the index of the Extended Dictionary (using the module ID obtained in step 614).

Step 621: Extract the pointers to the start of the Extended Dictionary Dependency List and to the start of the Extended Dictionary Externals List for the module.

Step 622: If the dependency pointer is undefined (set equal to −1), jump to step 631; no modules are needed by this module. Otherwise, proceed to the next step.

Step 623: Set the dependency pointer to the value of −1 (for avoiding future, duplicate processing).

Step 624: Retrieve the block/bucket (three bytes) ID stored in the Extended Dictionary Dependency List.

The ID points to the module needed by the current module (i.e., the one under current examination).

Step 625: If the block ID is not undefined (i.e., not set equal to −1), go to step 614 to retrieve the module name and (in a recursive fashion) process the module. If, on the other hand, the block ID is undefined at step 625, proceed to the next step to process the unresolved externals.

Step 626: If the pointer to the unresolved externals is undefined (i.e., there are no unresolved externals), then go to step 603 (to get the next external from the Externals Table). If the pointer to the unresolved externals is defined (yes at step 626), proceed to the next step.

Step 630: Set the value of the externals pointer to −1 (to avoid duplicate processing). Now, proceed to the next step for examining the strings for each of the unresolved externals.

Step 631: If the length of the next symbol and the first byte of the ASCII string are both set to −1 (e.g., a word value of 0×FFFF), then go to step 603, to retrieve the next entry from the Externals Table. If a valid symbol is found (no at step 631), then proceed to the next step.

The reason the first character of the ASCII string is set to −1 as well is to trap instances where the length may store a valid value of 0×FF or 256 decimal.

Step 632: Lookup the next symbol in the Extended Dictionary Externals List in the Symbol Table.

Step 633: If the symbol is found (i.e., already exists), go to step 631. Otherwise, go to the next step.

Step 634: Insert a public symbol record in the Symbol Table; insert a public record in the Publics Table; initialize the Symbol Table Definition Link to the public record in the Publics Table; set the public record attribute bits to "EXTDEF"; and insert an external record in the Externals Table. Loop back to step 631 to examine the next symbol.

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the following claims.

What is claimed is:

1. In a computer system which creates executable programs from a plurality of compiled object modules, said plurality of object modules having at least one public and external reference and selected ones of the object modules of which are stored in at least one library file, an improved method for linking the object modules into an executable program, the improvement comprising:
   (a) providing each library file with a Standard Dictionary, said Standard Dictionary being a portion of each library file having entries which lists all public references from the object modules stored in the library file where a public reference is capable of satisfying an external reference in another object module;
   (b) providing each library file with an Extended Dictionary, said Extended Dictionary being a portion of each library file which has a dependent modules list for each object module in the library file;
   (c) for each public reference entry in the Standard Dictionary which is not an object module name, storing a reference to a name of an object module which includes the public reference;
   (d) for each public reference entry in the Standard Dictionary which is an object module name, storing a reference to the dependent object modules list in the Extended Dictionary for the named object module;
   (e) for each external reference in a non-library object module which is not satisfied by another non-library object module during linking, said computer system locating a public reference in said at least one library file which satisfies the external reference; and
   (f) said computer system determining from said Standard Dictionary and said Extended Dictionary which object modules from the library file are necessary for linking.

2. The method of claim 1, further comprising:
   (g) for each object module in a library file, storing in the Extended Dictionary a list of references for the object module which are unresolved by the library file; and
   (h) for each public reference entry in the Standard Dictionary which is an object module name, storing a reference to the list of unresolved references for the named object module, whereby steps (e)–(f) are performed for any references from the list of unresolved references which has not been resolved.

3. The method of claim 1, wherein each Standard Dictionary entry includes a name and a file offset for the public reference.

4. The method of claim 1, wherein said reference to a name of an object module stored in Standard Dictionary entry includes a pointer back into the Standard Dictionary.

5. The method of claim 1, wherein each entry of the dependent object modules list references an entry of the Standard Dictionary which specifies the name of a dependent object module.

6. A computer system for creating an improved library file for storing compiled object modules having references, a reference being public if it is accessible by other object modules and a reference being external if it refers to a public reference in another object module, said system comprising:
   (a) means for storing in the library file a list of all public references in the object modules stored in the library file; and
   (b) means for storing in the library file for each of the object modules a list of object modules which depend from said each object module and a list of all references for the object module which are external to the library file, said lists for selecting object modules from the library file which are necessary for linking, an object module being necessary if it contains a reference needed during linking.

7. The system of claim 6, further comprising:
   (c) linker means for linking together selected ones of the object modules for constructing a program executable by a microprocessor, said means including means for determining from said lists said selected ones of the object modules stored in the library file to link.

8. The system of claim 6, wherein said list of all public references comprises a plurality of entries, each entry storing a name of a public reference followed by a pointer.

9. The system of claim 8, wherein, if said name of the public reference is not a name of an object module, said pointer points to an entry in the list for an object module which defines the public reference.

10. The system of claim 8, wherein, if said name of the public reference is a name of an object module, said pointer references an index to said list of object modules which depend from the object module and to said list of references for the object module which are external to the library file.

11. A development computer system for generating a computer program for instructing operation of a processor, the system comprising:
   compiler means for creating from source listings object modules having instructions for directing operation of the processor, said object modules including at least one object module which is dependent upon instructions of another object module;
   librarian means for storing a plurality of object modules together as a single library file, said librarian means including dictionary means for storing for each object module a first list specifying other object modules stored in the library file which said each object module is dependent upon and for storing for said each object module a second list specifying other object modules not stored in the library file which said each object module is dependent upon; and
   linker means for linking at least one object module with at least one library file for generating the computer program, said at least one object module being dependent upon at least one other object module stored in said at least one library file, said linker means including means, responsive to said dictionary means, for determining for said at least one object module all object modules stored in the library file which are necessary for generating the computer program.

12. The system of claim 11, wherein said librarian means includes means for storing a table having an entry for each reference within a library file which is public (global) to the library file.

13. The system of claim 12, wherein said table has a format which is compatible with Microsoft standard MS-DOS library format.

14. The system of claim 12, wherein each entry of said table includes a name of a public reference.

15. The system of claim 14, wherein said each entry further includes a pointer.

16. The system of claim 15, wherein a pointer for a public reference which is not an object module stores a reference to another entry of said table, the entry specifying an object module of the library file where said public reference is defined.

17. The system of claim 15, wherein a pointer for a public reference which is an object module stores a reference to said first and second lists for the object module.

18. The system of claim 17, wherein said reference to said first and second lists includes an index into a table storing first and second pointers, said first pointer referencing the first list for the object module, said second pointer referencing the second list for the object module.

19. The system of claim 15, wherein each name includes at least one byte value specifying a length of the name followed by at least one byte value specifying alphanumeric characters for the name, and wherein each pointer includes at least two byte values specifying another location in the library file.

20. The system of claim 12, wherein said first list includes entries specifying other object modules stored in the library file which said each object module is dependent upon, each of the entries storing a pointer specifying an entry in said table for one of said other object modules.

21. The system of claim 12, wherein said second list includes entries specifying other object modules not stored in the library file which said each object module is dependent upon, each of the entries storing a pointer to a character string specifying a name of one of said other object modules.

22. The system of claim 11, wherein each object module is stored in the system in a format compatible with Intel Object Module Format (OMF) standard.

23. In a computer system, a method for linking together a plurality of code modules storing processor instructions for generating a computer program, selected ones of the code modules being stored collectively within at least one library file, the method comprising:
   (a) storing for each code module of each said at least one library file a first list specifying interdependencies between said each code module and other code modules stored within its library file;
   (b) storing for each code module of each said library file a second list specifying interdependencies between said each code module and other code modules not stored within its library file;

(c) storing a third list in each said at least one library file, said third list specifying each code module stored in the library file and pointers to said first and second lists for said specified each code module;

(d) receiving an input specifying at least one object module to be linked with at least one library file for generating a computer program;

(e) for said at least one object module to be linked, determining from said first, second, and third lists which code modules stored within said at least one library file are required for linking; and (f) linking said at least one object module to be linked with said required code modules stored within said at least one library file for generating the computer program.

24. The method of claim 23, wherein step (e) includes:

for said at least one object module to be linked, locating which library file includes an object module required for linking by reading the third list of each said library file; and determining any other object modules required for linking by reading the first and second lists of each required object module located in a library file.

25. The method of claim 23, wherein step (f) includes reading only said required code modules from said at least one library file, whereby code modules stored within said at least one library file which are not needed for linking are not read.

26. A system for generating a program for operating a computer, the system comprising:

means for compiling source code files into at least one compiled code module;

means, receiving input from said compiling means, for storing selected ones of said at least one compiled code module in at least one library file, and including means for storing with each said at least one library file for each said at least one compiled code module a dependency list and an unresolved list, said dependency list specifying interdependent compiled code modules which are present within a same library file and said unresolved list specifying interdependent compiled code modules which are not present within the same library file;

input means for receiving a list of at least one compiled code module for linking with at least one library file;

means, receiving input from said compiling means, said storing means and said input means, for determining which compiled code modules of said at least one library file are necessary for linking; and means, receiving input from said compiling means, said storing means and said determining means, for generating the program by linking said at least one compiled code module of the list with said compiled code modules which are determined necessary for linking, whereby compiled code modules which are stored in said at least one library file and which are not necessary for linking are not processed by the system.

27. The system of claim 26, wherein each compiled code module comprises a plurality of records stored in a format compatible with Object Module Format (OMF) standard.

28. The system of claim 26, wherein the generating means includes means for scanning all said at least one library file for reading only compiled code modules which are necessary for linking.

29. The system of claim 26, wherein said determining means includes means for recursively processing said dependency and unresolved lists for each compiled code module called by a compiled code module of said list, whereby all compiled code modules called are processed by the generating means.

30. The system of claim 26, wherein each unresolved list stores names for symbols referenced by a compiled code module which are not resolved with a same library file, the names including names of other compiled code modules.

* * * * *